(12) United States Patent
Burton et al.

(10) Patent No.: US 11,414,196 B2
(45) Date of Patent: Aug. 16, 2022

(54) ICE PROTECTION SYSTEM AND CONTROLLER

(71) Applicant: Battelle Memorial Institute, Columbus, OH (US)

(72) Inventors: Brett Burton, Powell, OH (US); Donald R. Hohe, Powell, OH (US); Matthew E. Huntwork, Baltimore, OH (US); Gabe J. Stout, New Albany, OH (US)

(73) Assignee: BATTELLE MEMORIAL INSTITUTE, Colombus, OH (US)

( * ) Notice: Subject to any disclaimer, the term of this patent is extended or adjusted under 35 U.S.C. 154(b) by 482 days.

(21) Appl. No.: 16/173,389

(22) Filed: Oct. 29, 2018

(65) Prior Publication Data
US 2019/0176994 A1    Jun. 13, 2019

Related U.S. Application Data

(60) Provisional application No. 62/578,666, filed on Oct. 30, 2017.

(51) Int. Cl.
*B64D 15/12* (2006.01)
*B64D 15/14* (2006.01)
(Continued)

(52) U.S. Cl.
CPC .............. *B64D 15/12* (2013.01); *B64D 15/14* (2013.01); *F03D 80/40* (2016.05); *H05B 1/0236* (2013.01);
(Continued)

(58) Field of Classification Search
CPC ......... B64D 15/12; B64D 15/14; F03D 80/40; H05B 1/0236; H05B 3/145; H05B 2214/02; H05B 2214/04; H05B 2203/035
See application file for complete search history.

(56) References Cited

U.S. PATENT DOCUMENTS 6,283,411 B1 *   9/2001   Giamati ................ B64D 15/12
                                              244/134 A
2011/0240621 A1 * 10/2011 Kessler ................ G01N 25/00
                                              219/200
(Continued)

FOREIGN PATENT DOCUMENTS

EP          0855340 A2      7/1998
WO   WO 2007/107732 A1     9/2007
WO   WO 2012/092623 A2     7/2012

OTHER PUBLICATIONS

Anonymous: "Buck Convertor", Wikipedia, Aug. 26, 2017, XP055535125, Internet.
(Continued)

*Primary Examiner* — Nicholas McFall
(74) *Attorney, Agent, or Firm* — Fay Sharpe LLP

(57) ABSTRACT

An ice protection system and method capable of anti-icing and de-icing aerodynamic structures and surfaces is provided comprising a Resistive Heat Coat (RHC) controller and a heating device. The RHC controller comprises a RHC power circuit topology having a processor and a buck converter. The RHC controller further comprises a RHC control algorithm. The heating device comprises a plurality of resistive heating elements, such as CNT-based resistive heaters. The ice protection systems and methods disclosed can achieve an efficiency of 98% or greater while employing a direct current (DC) power supply and "hard switching" with a switching frequency of at least 500 kHz.

20 Claims, 13 Drawing Sheets

(51) Int. Cl.
*H05B 3/14* (2006.01)
*H05B 1/02* (2006.01)
*H05B 3/34* (2006.01)
*F03D 80/40* (2016.01)
*H05B 3/56* (2006.01)

(52) U.S. Cl.
CPC .............. *H05B 3/145* (2013.01); *H05B 3/34* (2013.01); *H05B 3/565* (2013.01); *H05B 2203/005* (2013.01); *H05B 2203/035* (2013.01); *H05B 2214/02* (2013.01); *H05B 2214/04* (2013.01)

(56) References Cited

U.S. PATENT DOCUMENTS

| | | |
|---|---|---|
| 2011/0290784 A1 | 12/2011 | Orawetz et al. |
| 2011/0297789 A1 | 12/2011 | Gallman et al. |
| 2014/0070054 A1 | 3/2014 | Burton et al. |
| 2014/0332521 A1* | 11/2014 | Shearer .................. G05D 23/24 219/494 |
| 2016/0221680 A1 | 1/2016 | Burton et al. |
| 2020/0124032 A1* | 4/2020 | Grun ....................... F03D 80/40 |

OTHER PUBLICATIONS

International Search Report for PCT Application No. PCT/US2018/057955 dated Jan. 11, 2019.

* cited by examiner

ICE PROTECTION SYSTEM AND CONTROLLER

CROSS-REFERENCE TO RELATED APPLICATIONS

This application claims priority to U.S. Provisional Patent Application Ser. No. 62/578,666, filed Oct. 30, 2017, titled ICE PROTECTION SYSTEM AND CONTROLLER, the entire disclosure of which is incorporated by reference herein.

BACKGROUND

The following relates generally to ice protection systems and methods, de-icing and anti-icing systems and methods, aerodynamic structures equipped with ice protection, de-icing, and anti-icing systems, air vehicle arts, unmanned autonomous vehicle arts, electronic controller arts, and the like. It finds particular application in conjunction with high-efficiency ice protection systems in low-power applications. However, it will be understood that it also finds application in other usage scenarios and is not necessarily limited to the aforementioned applications.

Aerodynamic surfaces, for example, wind turbines and airfoils, when exposed to atmospheric icing conditions are susceptible to ice build-up. If not removed, this accumulated ice can add excessive weight to the structure, alter the airfoil configuration, and negatively impact performance.

In particular, unmanned or autonomous aerial vehicles ("UAV"), more commonly known as "drones", have become more and more prevalent in both the military and civilian context, and are increasingly being used in a wide range of atmospheric conditions. Layers of ice can build up on the drone surfaces, dramatically affecting its aerodynamics and resulting in undesirable and/or dangerous flying performance. Ice can also accumulate and then detach, where it may be ingested by the engine or cause other damage to the aircraft.

Numerous attempts for preventing or removing ice from aerodynamic surfaces have been made. The ice protection systems in use typically operate using resistive heaters to prevent ice from forming on critical surfaces, such as engine inlets, rotor blades, wings, or other control surfaces. Electrical power is supplied to a conductive heating element that is placed near the surfaces requiring ice protection. However, typical ice protection systems and controllers require integration with the structural composite of the aerodynamic structure and cannot be retrofitted to existing structures. Furthermore, the location of the heaters far below the critical surfaces means that these systems require substantial power to effectively prevent ice accumulation or to remove existing ice layers.

Burton et al. in US 2014/0070054, filed Jan. 3, 2012, the contents of which are herein incorporated by reference, describes carbon nanotube (CNT) based resistive heaters for the deicing of airfoil surfaces, including a multi-panel structure such as that shown in FIG. 1. FIG. 1 shows a schematic 100 of a cross-section of an aircraft wing 112, central heater 122 at the stagnation zone, lower heaters 114 and 116, upper heaters 118 and 120, ice layer 126, and aerodynamic streamlines 124. In operation, central heaters along the stagnation line or zone would be generally heated continuously, but alternatively may be heated intermittently. Typically, any gap between panels would be filled by an insulating material, preferably the same polymer that overlies the CNTs.

Burton et al. in 2016/0221680, filed Jan. 5, 2016, the contents of which are herein incorporated by reference, describes a lightweight and compact CNT-based heating device that may include an array of individual heater cells and uses a zoned heating approach. The CNT-based heating devices may be integrated on the exterior surface of the aerodynamic structure.

For an in-flight ice protection system to function properly, it must maintain an appropriate application of heat along the critical surfaces. At higher power densities, such as needed for icing conditions at temperatures below 0° F. and airspeeds of about 150 to about 180 knots, or where atmospheric conditions have a higher liquid water content, the heating elements may overheat during powering, which can cause degradation of the CNT-based heating device and/or the associated airfoil structure. This can lead to catastrophic failure of the system and/or loss of structural integrity of the aircraft. For example, the maximum operating temperature of some carbon fiber aircraft is below 145° F. Moreover, the CNT-based heating devices are capable of heating very rapidly, and therefore can easily become overheated and cause damage to the aircraft.

In addition to the foregoing problems, drones have substantially decreased in size while the capabilities of the drones themselves have increased. As a result, the potential demand on the drone's power source has increased while simultaneously reducing the available space for such systems, components, and power supplies.

Thus, it would be advantageous to provide a high performance custom controller and ice protection system that can rapidly and efficiently respond to individual heater temperatures and changing atmospheric conditions.

BRIEF DESCRIPTION

The following discloses a new and improved ice protection system, utilizing a Resistive Heat Coat (RHC) controller capable of providing anti-icing and de-icing capability to aerodynamic structures that addresses the above referenced issues, and others.

In one embodiment, an ice protection system is provided comprising a heating device having a plurality of heating elements, and a controller configured to control the plurality of heating elements of the heating device. In particular embodiments, the ice protection system is associated with an aerodynamic structure, such as an aerial vehicle, or a portion thereof.

In some embodiments, the heating device comprises a plurality of heating elements that are CNT-containing resistive heaters. The heating device may comprise a plurality of heating elements (or a heater array) contained within a heater layer, such as a CNT heater layer. In particular embodiments, the plurality of heating elements may be grouped into one or more heater sections. The plurality of heating elements and/or the one or more heater sections may be independently powered.

In further embodiments, the controller may be an RHC controller comprising a power circuit topology. In some embodiments, the power circuit topology comprises a buck converter.

In particular embodiments, the power circuit topology employs a direct current (DC) power source and hard switching. In some embodiments, the power circuit topology has a switching frequency of at least 500 kHz. The buck converter of the power circuit topology may have one or more field-effect transistors comprising silicon carbide (SiC).

In some embodiments, the power circuit topology has a 98% or greater efficiency at rated output. In other embodiments, the switch transition time occurs in 10 nanoseconds or less.

According to another embodiment, the associated aerodynamic structure can include insulated electrical leads for powering the heating device, which connect the controller to the plurality of heating elements of the heating device, and redundant imbedded thermocouples in each of the individual heating elements of the heating device, which provide temperature information to the RHC controller.

The RHC controller may further comprise a processor configured to drive the power circuit topology. The power circuit topology may be driven based on a control algorithm. In particular embodiments, the control algorithm comprises a setpoint temperature module, a setpoint throttle module, and a proportional-integral-derivative (PID) control module. Each module may be stored in memory as instructions to be executed by the processor.

In accordance with another aspect of the present disclosure, a method of powering an ice-protection system of an associated aerodynamic structure is provided, wherein the method comprises the steps of: (i) sampling the temperature of at least one heating channel of the heating device; (ii) determining an ideal setpoint temperature for the at least one heating channel of the heating device; (iii) determining a progressively adjusted setpoint temperature for the at least one heating channel; (iv) generating a proportional drive signal for the at least one heating channel of the heating device; (v) converting the proportional drive signal for the at least one heating channel of the heating device into a power output to be delivered to at least one heating channel; and (vi) delivering the power output to the at least one heating channel.

In particular embodiments of the disclosed methods, one or more of sampling the temperature, determining an ideal setpoint temperature, determining a progressively adjusted setpoint temperature, generating a proportional drive signal, converting the proportional drive signal, and delivering the power output is performed by the controller of the ice-protection system.

BRIEF DESCRIPTION OF THE DRAWINGS

The subject disclosure may take form in various components and arrangements of component, and in various steps and arrangement of steps. The drawings are only for purposes of illustrating the preferred embodiments and are not to be construed as limiting the subject disclosure.

DETAILED DESCRIPTION

Figure 1:
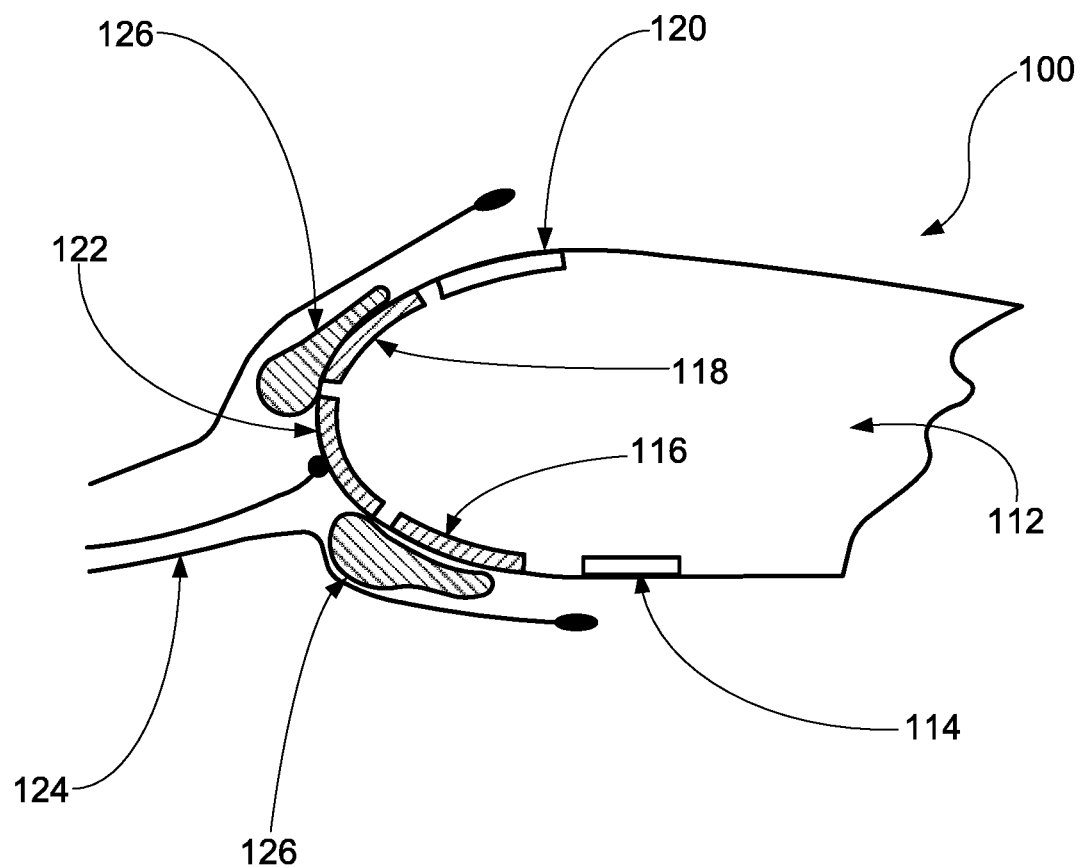
FIG. 1 schematically illustrates an embodiment of a cross-sectional view of heaters on an aircraft wing according to the prior art.

One or more embodiments will now be described with reference to the attached drawings, wherein like reference numerals are used to refer to like elements throughout. Aspects of the exemplary embodiments related to ice protection systems and methods are described herein. However, application of the systems and methods set forth can be made to other areas utilizing an anti-icing or de-icing protection, or to heating of existing structures or materials.

As used herein, the terms "aerodynamic structure" and "aerodynamic surface" refer to structures and surfaces over which a fluid flows. In particular, an aerodynamic structure or surface may refer to an aircraft, an airplane, a missile, an airfoil, or a portion thereof, such as a wing, a blade, an engine air inlet, or a nosecone.

The term "carbon nanotube" or "CNT" includes single, double, and multiwall carbon nanotubes and, unless further specified, also includes bundles and other morphologies. The invention is not limited to specific types of CNTs. The CNTs can be any combination of these materials, for example, a CNT composition may include a mixture of single and multiwall CNTs, or it may consist essentially of double-walled carbon nanotubes ("DWNT") and/or multi-walled carbon nanotubes ("MWNT"), or it may consist essentially of single-walled carbon nanotubes ("SWNT"), etc. CNTs may have an aspect ratio (length to diameter) of at least 50, preferably at least 100, and typically more than 1000. In some embodiments, a CNT layer is continuous over a substrate; in other embodiments, it is formed of rows of CNT networks separated by rows of a polymer (such as CNTs deposited in a grooved polymer substrate).

As described herein, ice protection systems may be adapted for use in conjunction with aerodynamic structures, such as unmanned aerial vehicles, and portions thereof. Such ice protection systems can comprise a controller and a heating device, wherein the controller comprises a power circuit topology. The heating device may comprise a plurality of resistive heating elements, or an array of heaters. The heating elements (i.e. array) can be grouped into one or more independently powered heater sections or channels. In other words, the heating device may comprise one or more heater sections or channels, each comprising one or more resistive heating elements.

RHC Heating Device

Figure 2:
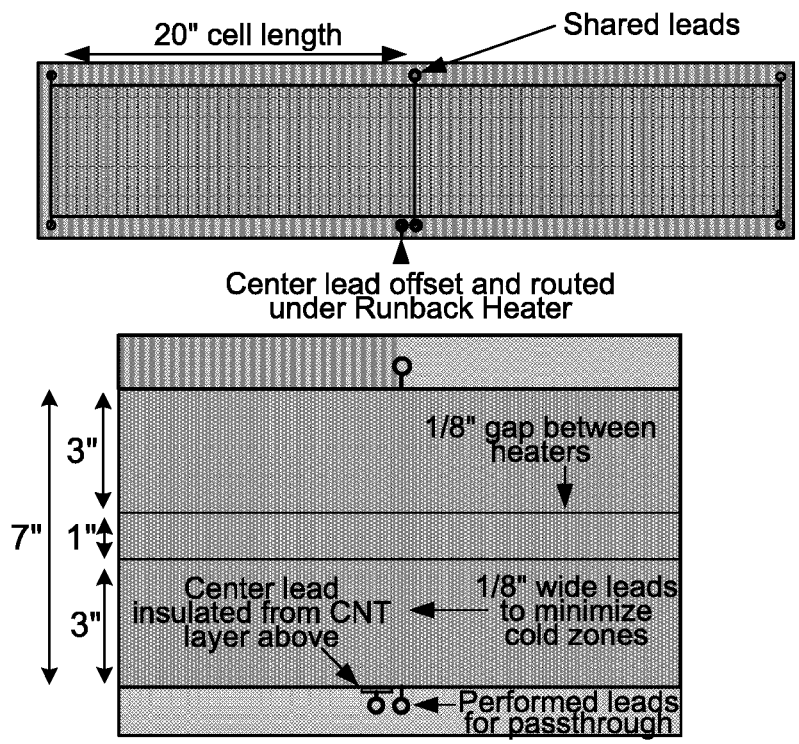
FIG. 2 illustrates a configuration for a heater array created on a single sheet with electrical leads run back to a pass-through location according to the prior art.
Figure 3:
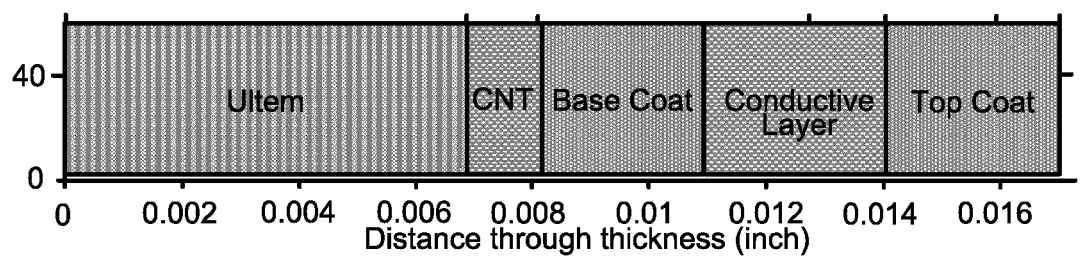
FIG. 3 illustrates one exemplary embodiment of a system having a heat spreading coating (conductive layer) on top of the CNT heater layer.

With reference to FIGS. 2 and 3, the heating device may be a CNT-based heating device. Suitable examples of such CNT-based heating devices are described in US 2016/0221680, filed Jan. 5, 2016, and titled UNIFORM HEAT DISTRIBUTION IN RESISTIVE HEATERS FOR ANTI-ICING AND DE-ICING, the entire disclosure of which is incorporated by reference herein. Other aspects of CNT-based heating devices, as will be appreciated by those skilled in the art, may be utilized in accordance with varying embodiments contained herein.

Figure 4:
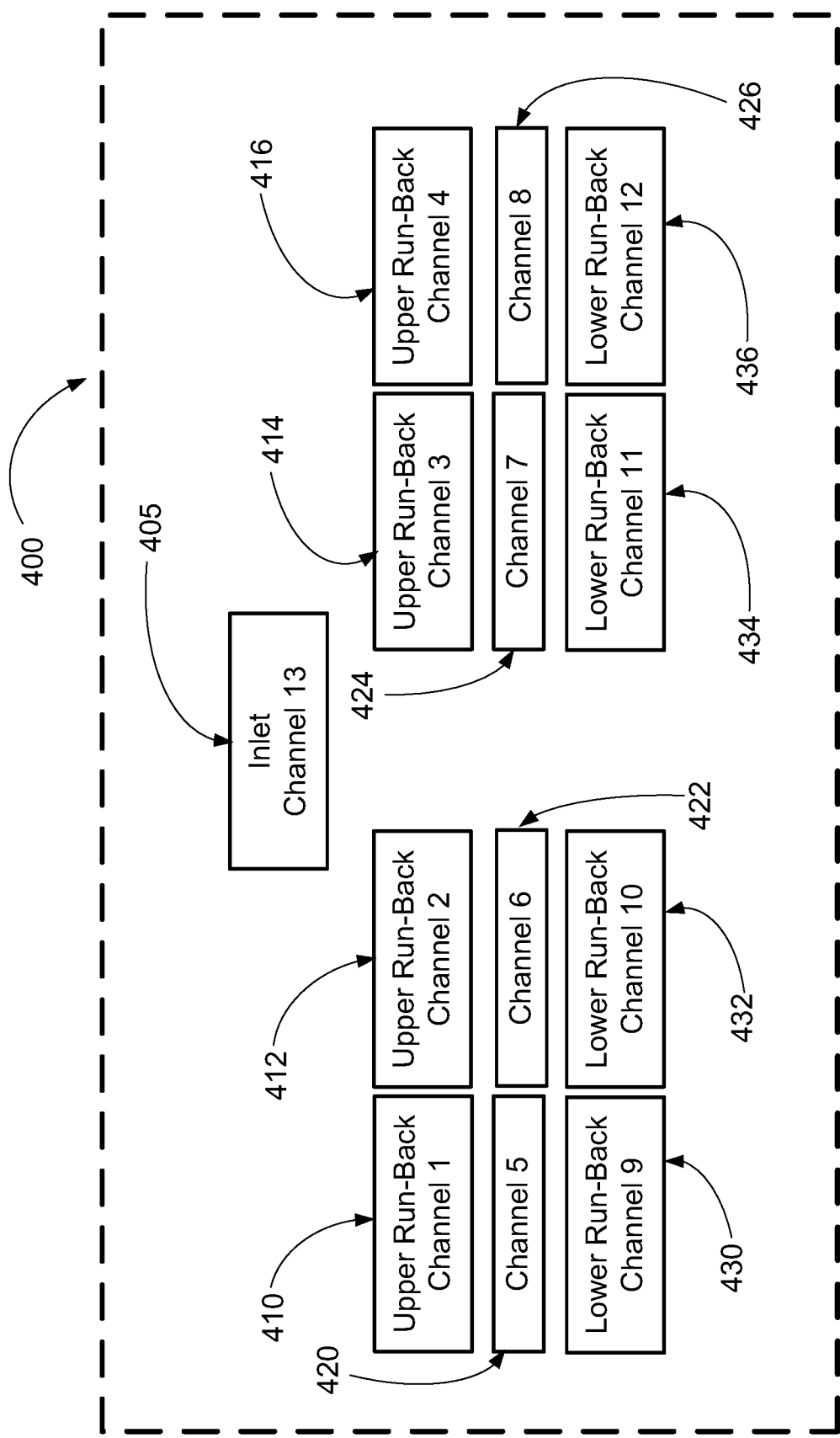
FIG. 4 shows a representative physical heater device placement for a flying vehicle.

With reference to FIG. 4, a representative example of the placement of physical heaters is shown in accordance with another embodiment of the present disclosure. The heating device 400 comprises an array of heaters arranged into thirteen heater sections (i.e. heater channels). The device 400 includes an inlet heater channel 405, upper run-back channels 410, 412, 414, 416, intermediate channels (i.e. "parting strip" channels) 420, 422, 424, 426, and lower run-back channels 430, 432, 434, 436.

RHC Controller (i) RHC Power Electronics Design Topology

The controller may comprise a power circuit topology having a buck converter. In particular embodiments, each heater section or channel of the heating device may be connected to a power supply via an individual power circuit topology. In other words, the controller of the ice protection system may include one or more power circuit topologies corresponding to one or more heater sections or channels of the heating device.

Figure 5:
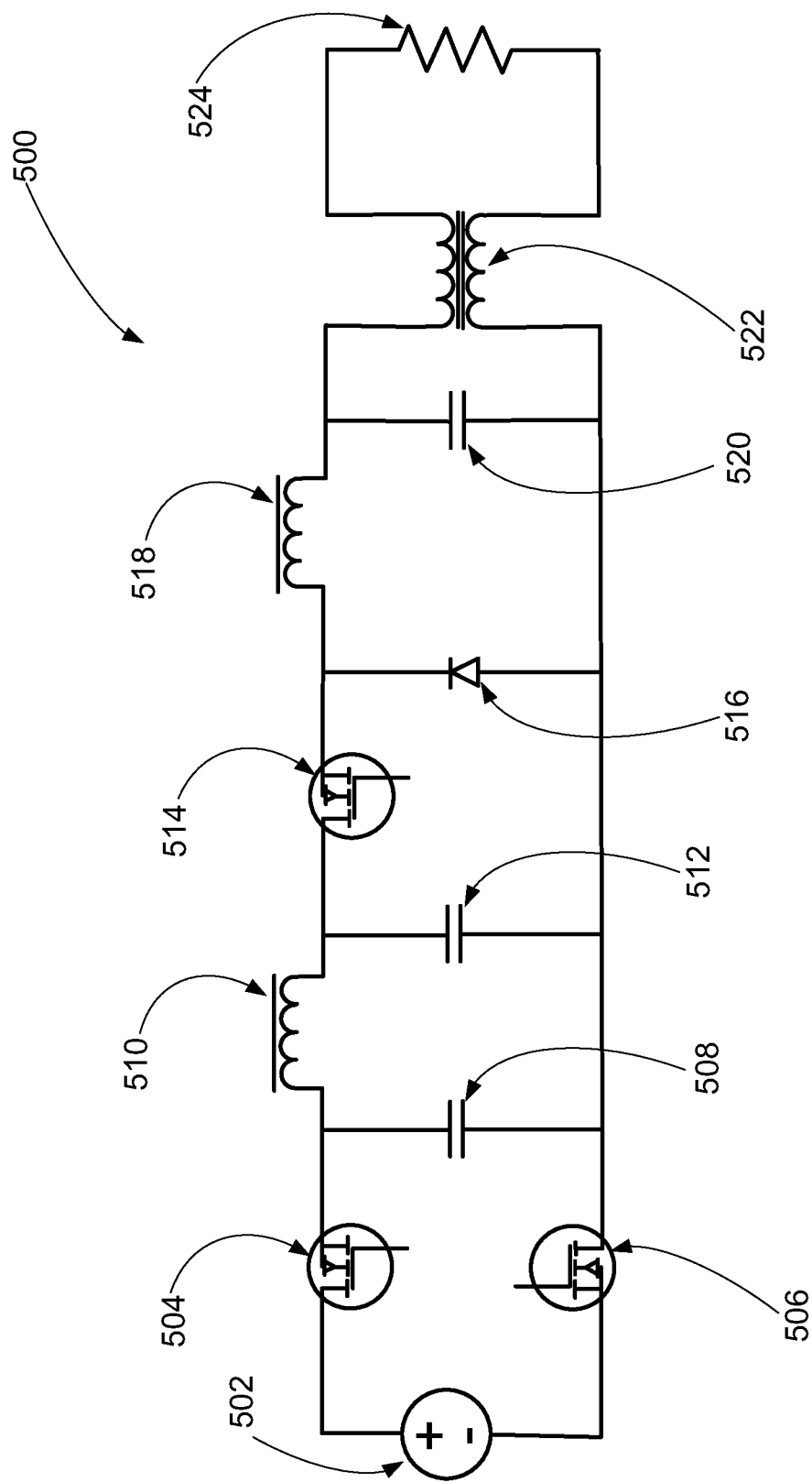
FIG. 5 illustrates one embodiment of a buck converter arrangement and input protection circuitry for operating a resistive heating element.

With reference to FIG. 5, one embodiment of a buck converter 500 arrangement according to the present disclosure is illustrated. The buck converter 500 is supplied with an input voltage of 270 volts by a power supply 502. The buck converter 500 can comprise a high side protection field-effect transistor (FET) 504, a low side protection FET 506, a high side switching FET 514, a freewheeling diode 516 (or a low side switching FET), an output inductor 518, and output capacitor 520. One or more of the components 504, 506, 514, 516, may comprise silicon carbide (SiC). The buck converter 500 may further comprise at least one of an input filter and an output filer. The input filer may include, without limitation, an input inductor 510 or one or more input capacitors 508 and 512. The output filter may include, without limitation, an output capacitor 520 or an output choke 522. As illustrated, the buck converter 500 may connect the power supply 502 to a resistive heating element 524.

In particular embodiments, the power circuit topology (e.g. buck converter 500) of the controller can provide from about 0 W to 1800 W of power to one or more of the heating elements per output channel. The power circuit topology (e.g. buck converter 500) can accept an input voltage of about 50 V to 350 V, and have an output voltage of between 0 and 300 volts. In some embodiments, the controller provides 1.5 kW of power per output channel to the heating device between 0 V and 220 V, with an input voltage of about 270 volts that is provided by input power conditioning circuitry that converts the drone's available 28 VDC to 270 VDC. Other embodiments include input power conditioning circuitry that converts 115 V three-phase AC to 270 VDC. In one embodiment disclosed herein, the input power conditioning circuitry can supply enough power for the controller to provide a total output power of about 3200 W to the heading device.

Figure 6:
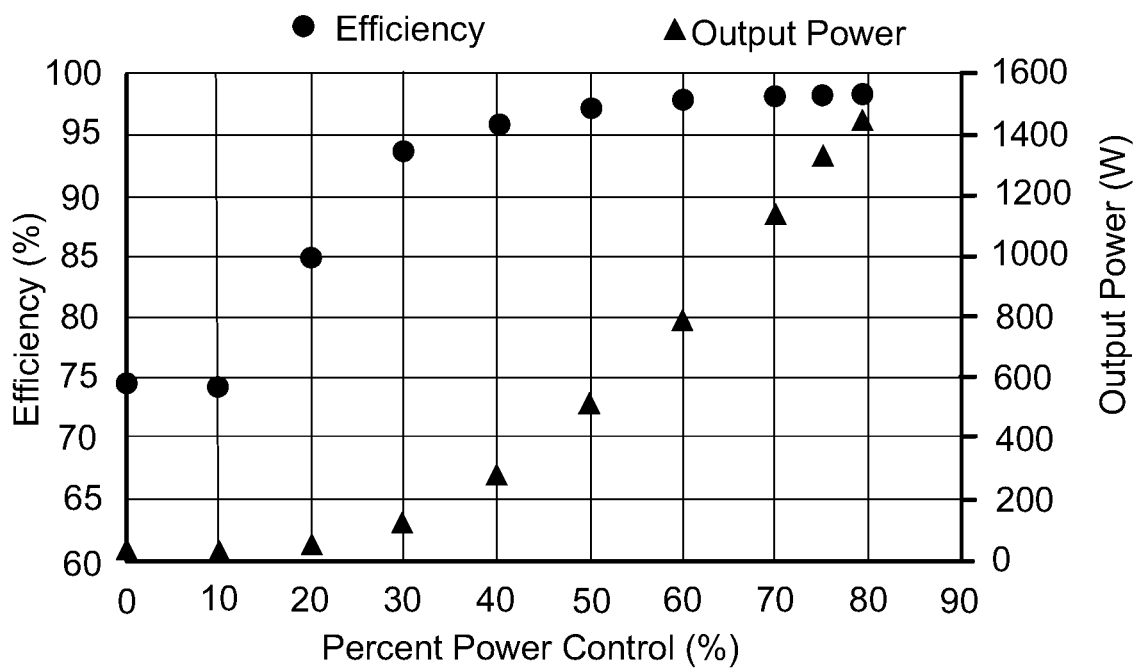
FIG. 6 is a chart showing the measured efficiency and output power of one embodiment of the disclosed controller power circuit topology.
Figure 7:
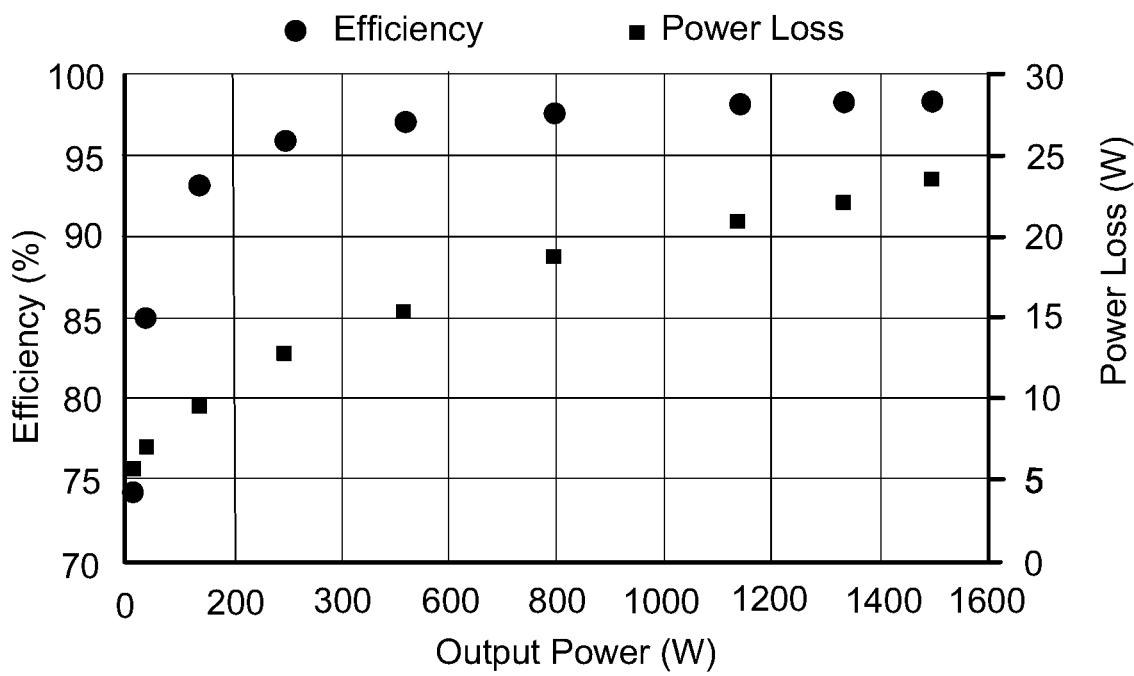
FIG. 7 is a chart showing the measured efficiency and power loss of one embodiment of the disclosed controller power circuit topology.

The power circuit topology can employ hard switching, i.e., is connected to a DC power supply that switches between on and off states at a switching frequency. In preferred embodiments, the power circuit topology has a switching frequency of 500 kHz or greater. In further embodiments, the power circuit topology has a transition time less than 10 nanoseconds (i.e. between on and off states). Typically, "hard switching" introduces transients, heat dissipation losses, and EMI problems that negatively affect system performance. Moreover, previously running a buck converter at high frequencies would have resulted in significant power losses. However, as shown in FIGS. 6 and 7, the power circuit topology according to the present disclosure can have an efficiency of 98% or higher at the rated output.

In some embodiments, the power circuit topology is an RHC Controller Circuit Card Assembly ("CCA") comprising a microcontroller having a processor, a protect circuit, and one or more buck converter arrangements connected to an array of heating elements.

(ii) RHC Controller Modules/Algorithm

The RHC Control Algorithm is configured to control the temperature and maximum allowed power density to the RHC heater sections. The algorithm in some embodiments can utilize a classic control loop, wherein temperature (the process variable) may be controlled by directing power to heater elements, and temperature can be measured as feedback by a device such as a thermocouple or resistive thermal device. In some embodiments, the temperature can be grossly managed by a timed application of an adjustable amount of power which may be determined based on measured conditions.

Figure 8:
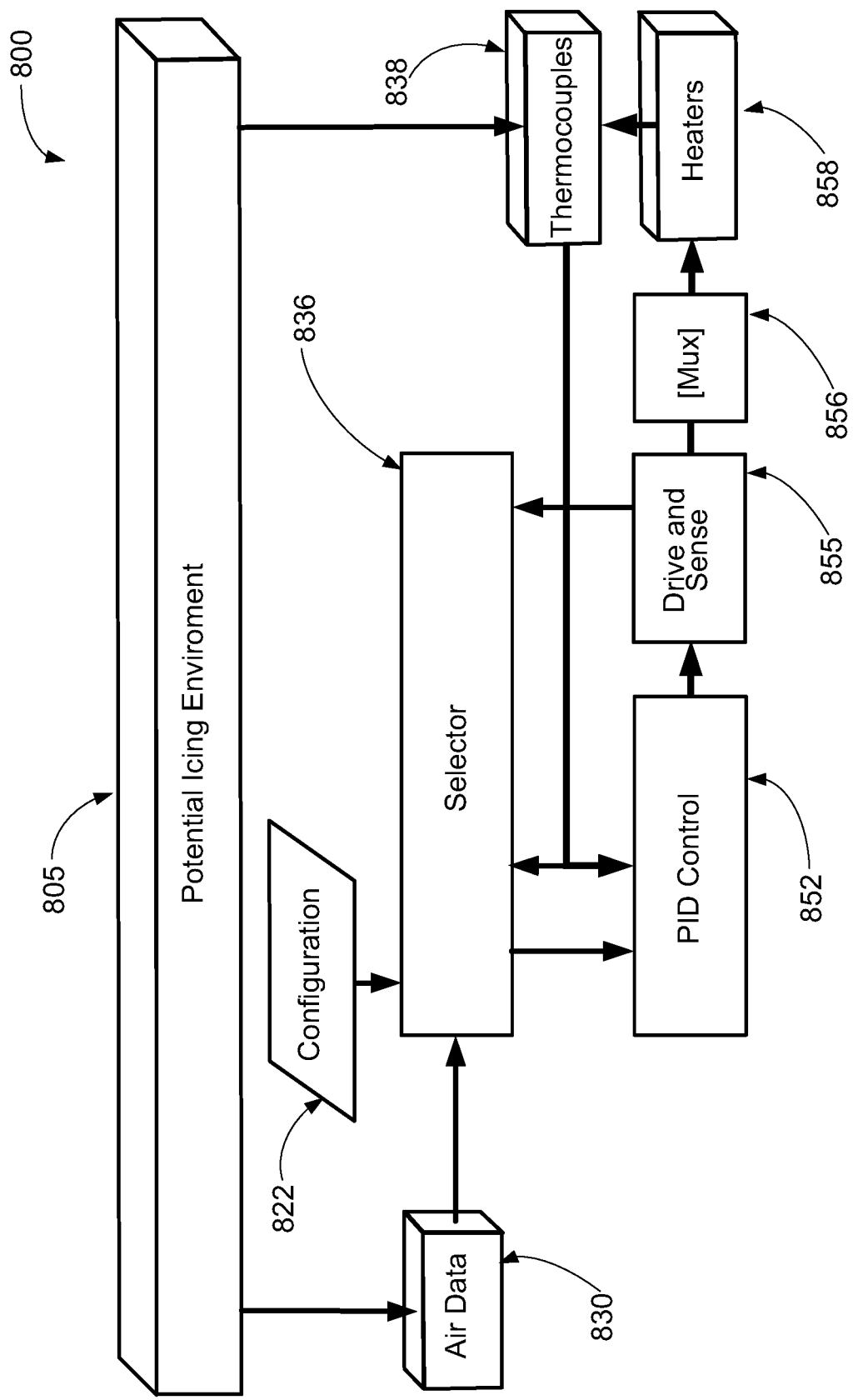
FIG. 8 illustrates control flow of the RHC Controller in accordance with one embodiment of the disclosure.

With reference to FIG. 8, the controller algorithm 800 can comprise a Selector 836, a proportional-integral-derivative (PID) Control Module 852, and a Drive and Sense Module 855.

A PID Control Module 852 determines a drive signal level to send to a Drive and Sense Module 855, which sends a commensurate power level to heaters 858 which can be through a demultiplexer 856 if utilized. In other words, the heating elements of the heating device 858 may be divided or grouped into one or more heater sections, and the Selector 836 determines an ideal setpoint temperature for at least a first heater section of the heating device 858. Then, the Selector 836 adjusts the ideal setpoint temperature over time to provide a more control-friendly target temperature (e.g. reduce step functions so that thermal overshoot is minimized) based on primarily the ideal setpoint temperature and present temperature. Next, the PID Control Module 852 produces a heater drive signal output for the one or more heating elements (i.e. the heater section 858). In particular embodiments, the heating device 858 may be an array of heating elements. The heaters 858 heat up the aerodynamic structure, which in some embodiments can have thermocouples 838 installed in proximity to (e.g. beneath) the heaters 858. The thermocouples 838 can provide feedback that the PID Control Module 852 uses to control its drive signal to achieve and maintain a desired temperature setpoint so that aerodynamic structural ice accumulation due to the icing environment 805 is limited or removed. An optional demultiplexer (MUX) element 856 can direct or divide power among a number of selected heaters 858.

In certain embodiments, the algorithm 800 can incorporate a Selector 836, which dynamically modifies control loop operation configured to do one or more of the following:

(1) provide autonomous preventative (e.g. anti-ice) or deice behavior, requiring aerodynamic structure state inputs, which may be provided by an air data source 830 and/or an ice rate meter external to the controller from which the algorithm can decide appropriate heating setpoints and sequences per a configuration file 822 or empirical formula;

(2) protect against heater 858 or aerodynamic structure overtemperature, in the form of modified setpoints which curb control loop overshoot; and (3) maintain a RHC total power draw within the RHC's power allocation on the aerodynamic structure's power bus. The algorithm can de-allocate channels until the total power draw is acceptable.

Figure 9:
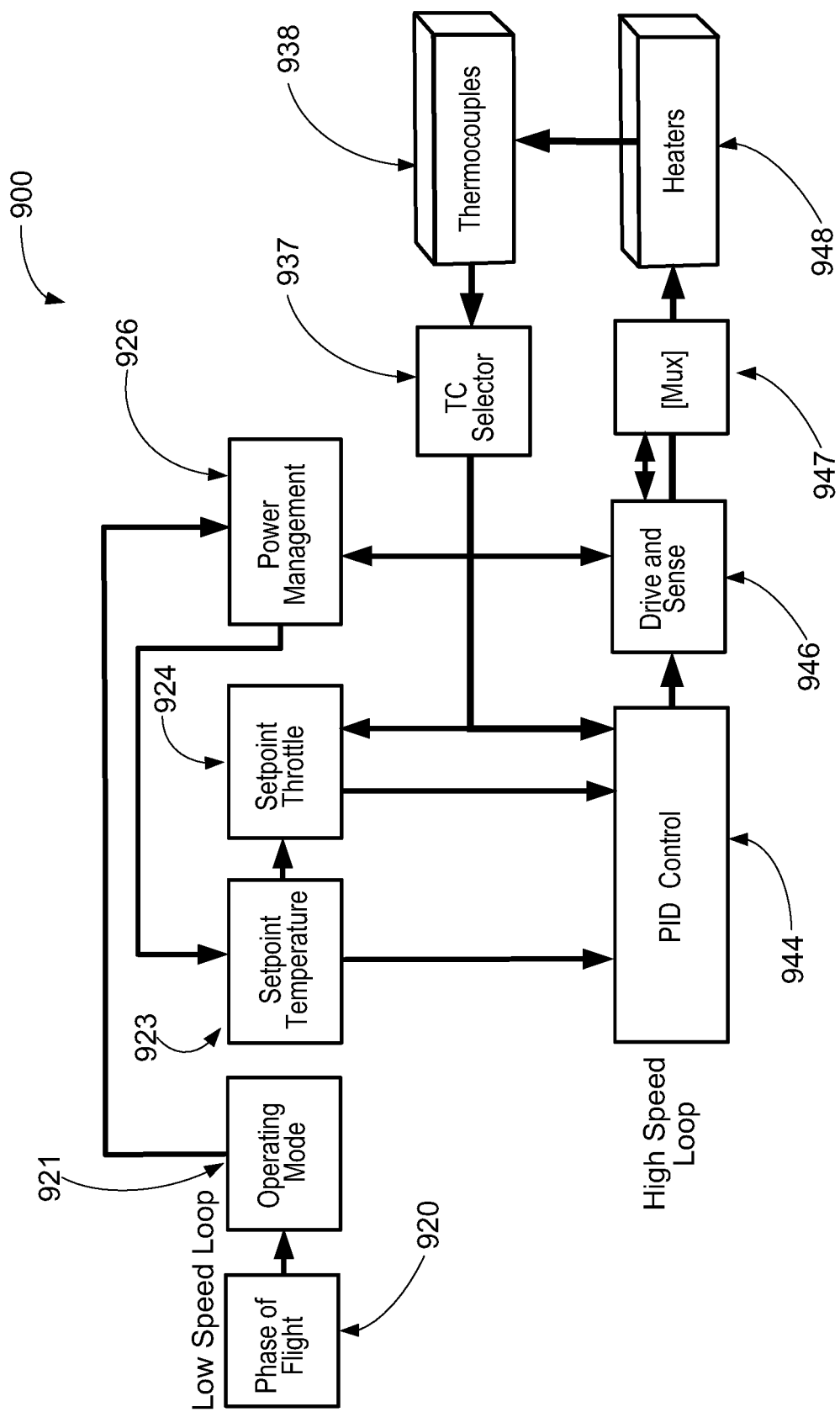
FIG. 9 is a block diagram illustrating an ice protection control loop according to another embodiment of the present disclosure.

Overtemperature (i.e. over-heating) protection of the heater(s) 858 and aerodynamic structure can be provided by a setpoint temperature module and a setpoint throttle module, which can be internal components of the Selector 836 (shown in FIG. 9). The setpoint temperature module inside the Selector 836 can determine the appropriate ideal setpoint for each heater section based on air data 830. The Setpoint Throttle Module 924 (shown in FIG. 9) may take the ideal setpoint from the setpoint temperature module and modify it to elicit a faster but non-overshooting response from the PID Control Module 852. The PID Control Module 852 thus may adjust the control loop operation towards the intermediate or modified or "throttled" temperature setpoint. The modified setpoint in one embodiment is a sinusoidal approach function wherein step changes in temperature setpoints are smoothed out by transitioning from present observed temperature to the desired setpoint using a progressive set of setpoints that vary by a $T=\sin(t)$ function.

In other embodiments as depicted in FIG. 9, the controller can comprise a Setpoint Temperature Module 923, a Setpoint Throttle Module 924, and a proportional-integral-derivative (PID) Control Module 944. After the Setpoint Temperature Module 923 determines an appropriate ideal setpoint temperature for one or more heating elements of the heating device 948, the Setpoint Throttle Module 924 receives the setpoint temperature from the Setpoint Temperature Module 923, and determines a safe, intermediate temperature adjustment setting (i.e. an incremental temperature setpoint) based on the ideal setpoint temperature. Next, the PID Control Module 944 produces a heater drive signal output for the one or more heating elements 948 (i.e. the heater section).

In other embodiments, the controller may comprise additional modules controlling the heating device (e.g. array of heaters), including, for example and without limitation: a Phase of Flight Module 920; a Thermocouple Channel Select 937; an Operating Mode Module 921; a Setpoint Temperature Module 923; a Setpoint Throttle Module 924; a PID Control Module 852/944; a Drive and Sense Module 855/946; and a Power Management Module 926. There can also be an optional Demultiplexer Module 856/947. As shown in FIG. 9, a control loop 900 is illustrated in accordance with one embodiment of the present invention. The controller may comprise: (1) a high-speed loop with a temperature update rate of about 25 milliseconds or less, and (2) a slow-speed loop with a temperature update rate of about 1 second. The high-speed loop maintains temperature control and protects the heaters 858/948 from excessive power application, and is illustrated in the loop including at least: the PID Control Module 852/944; the Drive and Sense Module 855/946; the heaters 858/948; the Thermocouples 838/938; and the Thermocouple Channel Select 937 (back to the PID Control Module 852/944). The low-speed loop determines the operating temperature setpoint and the maximum allowed power density for the heaters, and is illustrated in the loop including at least: the Phase of Flight Module 920; the Operating Mode Module 921; the Setpoint Temperature Module 923; and the Power Management Module 926.

The controller and controller modules are described in more detail below.

Phase of Flight Module (920)

As shown in the control loop 900 illustrated in FIG. 9, the controller may comprise a Phase of Flight Module 920. The Phase of Flight Module 920 can determine a phase of flight state of the aerodynamic structure associated with the ice protection system of the present disclosure. In particular embodiments, the phase of flight state can be one of the following, for example and without limitation: ground; take-off; climb (i.e. ascending); cruise (i.e. loiter); descent (i.e. descending); and landing. In some embodiments, the phase of flight state may also be a payload enabled state or a restricted power state. For example, in a payload enabled state or a restricted power state, the associated aerodynamic structure (e.g. drone) does not have the power available to operate both the ice protection system and another critical system (e.g. a payload system) in normal mode. Thus, in a payload enabled state or other restricted power state, the ice protection system operation is limited (e.g. maximum system power), which may result in some degradation of performance of the ice protection system but can permit compatibility with other systems.

The Phase of Flight Module 920 can determine the phase of flight state for the associated aerodynamic structure based on several input signals depending on the type of structure. In particular embodiments, the phase of flight state is determined based on aircraft information, such as the angle of attack, true airspeed, pressure altitude, outside air temperature, weight on wheels, aircraft ice sensor data, and payload in use status. In further embodiments, the phase of flight state is determined based on configuration settings, such as flight duration, speed thresholds, and changes in altitude.

For example, the phase of flight state may be determined as shown in Table 1.

TABLE 1

|  | Speed < X1 | X1 ≤ Speed < X2 | Speed ≥ X2 and Not Payload In Use | Speed ≥ X2 and Payload In Use |
| --- | --- | --- | --- | --- |
| Climb rate ≥ Y1 | Ground | Take-off | Climb | Payload |
| −Y2 < Climb rate < Y1 |  |  | Cruise | Enabled |
| Climb rate ≤ −Y2 |  | Landing | Descent |  | wherein Y1, Y2, X1, and X2 are predetermined values.

In particular embodiments, the phase of flight state is determined for the entire aerodynamic structure (e.g. aircraft). In other words, there is only one phase of flight state for the associated structure at a time. Additionally, in further embodiments, the phase of flight state will remain/persist for a minimum duration according to the configuration settings.

Thermocouple Channel Select (937)

As shown in the control loop 900 illustrated in FIG. 9, the controller may comprise a Thermocouple Channel Select 937. In such embodiments, the ice protection system comprises a controller having a power circuit topology that includes at least one thermocouple connected to or in proximity to each heating element (or each section of heating elements). The Thermocouple Channel Select 937 determines which thermocouple each channel (e.g. drive/feedback loop) will utilize (e.g. the hottest "valid" temperature) and conditions the temperature measurements from each heater (e.g. by removing noise).

In particular embodiments, the Thermocouple Channel Select 937 may comprise an analog input board, and can have a sampling rate of about 1 kS/s. However, because of the small signal voltage from the thermocouples, the sample inputs are expected to be noise-susceptible. Thus, multiple samples should be taken and an impulse noise filter can be implemented. In some embodiments, the impulse noise filter can take at least three samples and discard the samples if they are not all within an error margin.

In some embodiments, the Thermocouple Channel Select 937 provides an output measurement at a periodicity of 25 milliseconds, and the Thermocouple Channel Select 937 therefore could take between 20 and 25 samples per period. In one embodiment disclosed herein, a sample can be taken every 8 milliseconds, and a three-sample average may be provided every 25 milliseconds, in order to reduce computer load. Thus, in particular embodiments, a combination of impulse filtering and averaging is employed. In preferred embodiments, the Thermocouple Channel Select 937 outputs the highest measured thermocouple temperature for each channel after rejecting invalid samples.

Operating Mode Module (921)

As shown in the control loop 900 illustrated in FIG. 9, the controller may comprise an Operating Mode Module 921. The Operating Mode Module 921 can determine an operating mode for the ice protection system. In other words, the ice protection system has an operating mode, which can be determined by the Operating Mode Module 921. In particular embodiments, the operating mode can be, for example and without limitation: standby; warm-up; active; or de-icing.

The Operating Mode Module 921 can receive various inputs, including: the selected thermocouple channel measurements; the phase of flight state; and information about the external conditions of the associated aerodynamic structure, such as the outside air temperature and the pressure altitude. The Operating Mode Module 921 can then determine whether the associated aerodynamic structure is in a non-icing condition zone, a pre-icing condition zone, a likely icing condition zone, or a post-icing condition zone.

Figure 10:
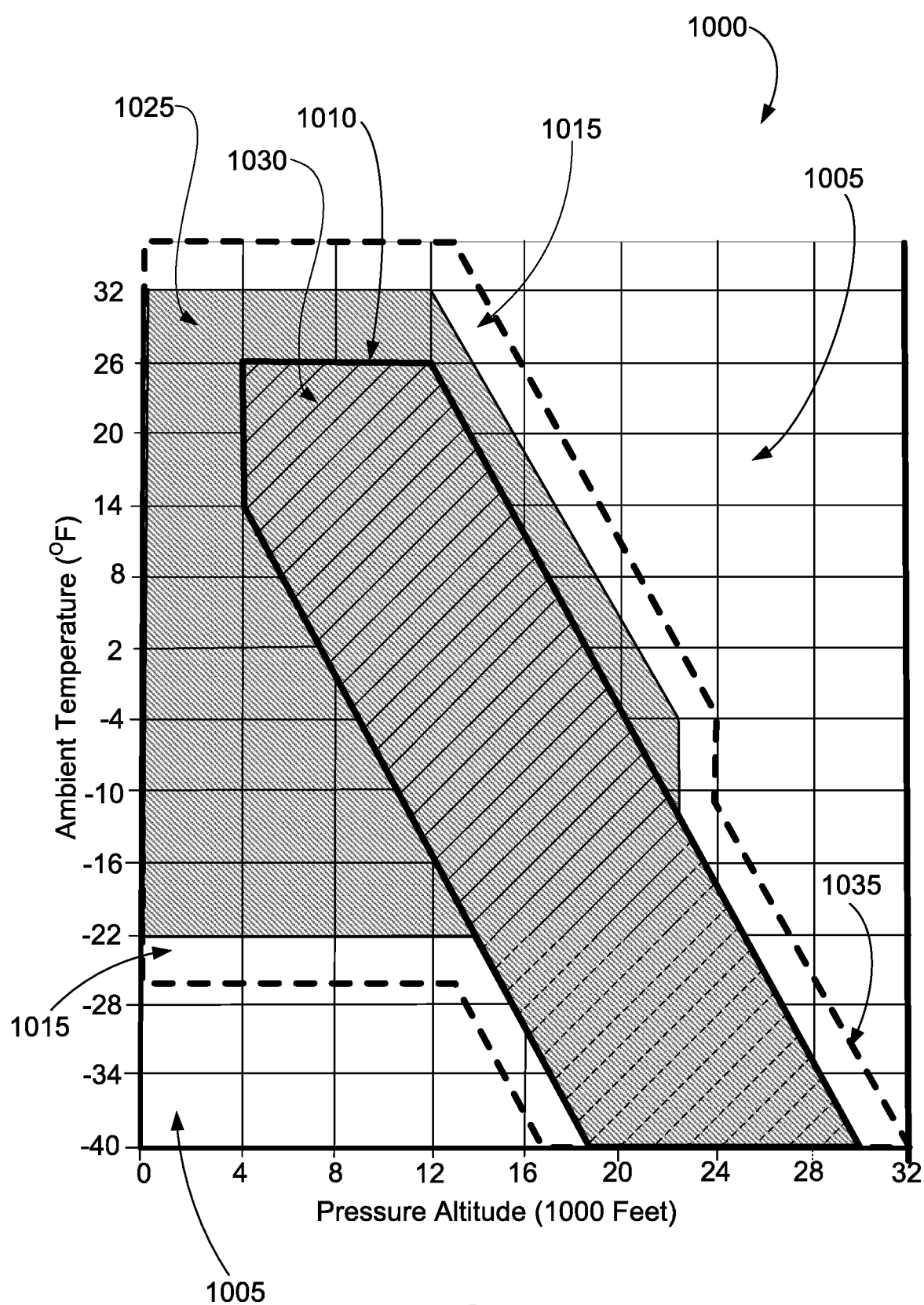
FIG. 10 is a modified National Advisory Committee for Aeronautics ("NACA") chart used to determine the likelihood of icing in accordance with one embodiment of the present disclosure.

With reference to FIG. 10, NACA chart 1000 illustrating potential icing conditions based on ambient temperature and pressure altitude, which can be used by the Operating Mode Module 921 to determine the likelihood of icing. In accordance with one embodiment of the present disclosure, various "zones" may be defined and operating modes assigned based on such zones. For example and without limitation, Zone 1 (standby or de-icing), Zone 2 (warm-up or de-icing), and Zone 3 (active) may be defined as shown in FIG. 10 and described below.

The shaded region 1025 (which includes the hatched region 1030 enclosed by a boundary line 1010) indicates the combinations of altitude and temperature where structural icing is likely. This region 1025 of the chart has been designated Zone 3, where active de-icing or anti-icing activity may occur.

A boundary region 1015 surrounding the shaded region 1025 and enclosed by a boundary line 1035 indicates where the temperature/altitude profile is "close to" Zone 3. Although FIG. 10 shows that the shaded region 1025 and the boundary region 1015 overlap along the x-axis and y-axis, those skilled in the art will appreciate that the boundary region 1015 can includes a region such that the shaded region 1025 is completely incorporated without overlapping. In accordance with the embodiment illustrated, the boundary region 1015 was determined to have a 2000-foot altitude margin (in the x-axis) beyond the defined extents which provides a minute or two of preparation (i.e. pre-heat) time at typical vertical velocities. The warmer temperature extension incorporates a four-degree Fahrenheit buffer (in the y-axis). The diagonals were extrapolated from the 2000-foot margin to retain a similar altitude buffer in the x-axis and a four-degree margin in the y-axis. The lower temperature extension was drawn for a four-degree (° F.) margin to match the upper thermal margin. This boundary region 1015 is designated Zone 2, where pre-icing conditions may occur.

The region 1005 outside of the boundary region 1015 (i.e. the regions above and below the dotted line 1035) indicates where the structural icing is unlikely to occur (i.e. the aircraft is in non-icing conditions). The non-icing region 1005 has been designated Zone 1, where standby activities may be performed.

Figure 11:
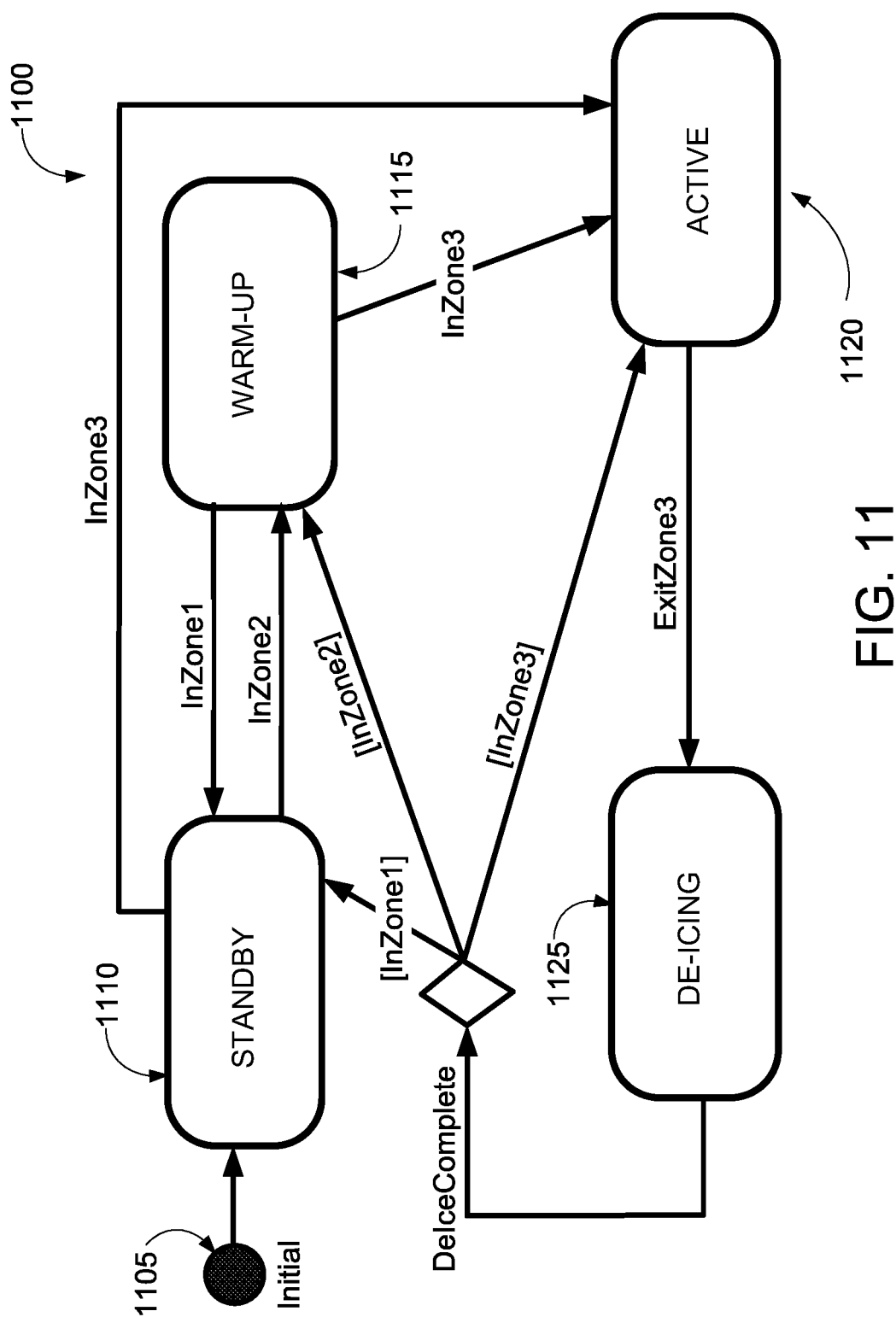
FIG. 11 is a state diagram for the operating modes associated with cycling of heating element sections in accordance with another aspect of the present disclosure.

The Operating Mode Module 921 then determines a mode state based on the determined condition zones and other inputs, for example, as illustrated in the mode state diagram 1100 shown in FIG. 11. When the power system is enabled (condition 1105), the Operating Mode Module 921 may shift between a standby mode 1110, a warm-up mode 1115, an active mode 1120, and a de-icing mode 1125. The Operating Mode Module 921 may switch from the standby mode 1110 to a warm-up mode 1115 when the associated aerodynamic structure transitions from Zone 1 (1005) to Zone 2 (1015). The Operating Mode Module 921 may switch from the warm-up mode 1115 to an active mode 1120 when the associated aerodynamic structure transitions from Zone 2

(1015) to Zone 3 (1025). The Operating Mode Module 921 may also switch to active mode 1120 if it is determined that the aerodynamic structure is in Zone 3 (1025) even if previously in Zone 1 (1005). The operating mode module 921 may switch from the active mode 1120 to a de-icing mode 1125 when the associated aerodynamic structure transitions from Zone 3 (1025) to any other zone. When the de-icing mode cycle is completed, the Operating Mode Module 921 can switch to the standby mode 1110, the warm-up mode 1115, or the active mode 1120, depending on the present icing risk zone. In particular embodiments, the Operating Mode Module 921 may switch from the warm-up mode 1115 to the standby mode 1110 when the associated aerodynamic structure transitions from Zone 2 (1015) to Zone 1 (1005). Additionally, the Operating Mode Module 921 may switch from the standby mode 1110 to the active mode 1120 when the associated aerodynamic structure transitions from Zone 1 (1005) to Zone 3 (1025).

Thus, in particular embodiments, the operating mode state changes based on the zone transitions as shown in FIG. 11. There may also be a switch from active mode 1120 to de-ice mode 1125 after a pre-defined amount of time in active mode or other impetus (e.g. pilot command).

The mode state determined by the Operating Mode Module 921 determines how the heating elements of the heating device are operated. In a standby mode 1110, the system power is on, Built-In Test (BIT) is performed (typically fault detection including one pass through a low-power continuity check of the heating device 858/948), data is processed, but all heater channels are disabled. In a warm-up mode 1115, enabled heater channels (e.g. parting strip, tail, or inlet types) are maintained at a temperature dependent on flight conditions from flight data 830 that allows the heaters to respond quickly enough to melt ice freezing on designated surfaces. The warm-up mode 1115 is also used in preparation for entry into active mode 1120. In an active mode 1120, enabled heater channels (e.g. parting strip, tail, or inlet types) are maintained at a temperature dependent on flight conditions from flight data 830 that melts the ice on the aerodynamic surfaces. The active mode 1120 is typically used when icing is likely. In the de-icing mode 1125, enabled heater channels are maintained at a temperature dependent on flight conditions from flight data 830 that melts the ice on the aerodynamic surfaces that may include additional aerodynamic surfaces (e.g. run-back zones), but this mode is used after the aerodynamic structure has left icing conditions.

In particular embodiments, the operating modes can be cycled such that not all heating elements or heater sections of the heating device are powered at the same time. In other words, a heating device may have a single operating mode state at a time, but one or more heater sections (i.e. heater channels) may alternate being powered in accordance with that operating mode state. The cycling of the heating program may be handled by the Power Management Module 926 discussed below.

Setpoint Temperature Module (923)

As shown in the control loop 900 illustrated in FIG. 9, the controller may comprise a Setpoint Temperature Module 923. The Setpoint Temperature Module 923 can determine the associated temperature setpoint and PID coefficients for each enabled channel.

In particular embodiments, the Setpoint Temperature Module 923 may receive inputs including: the phase of flight state; the operating mode state; whether the channel has been budgeted; and aerodynamic structure information (which may include for example angle of attack, true airspeed, pressure altitude, outside air temperature, aircraft ice sensor data). The Setpoint Temperature Module 923 can determine: each channel's ideal temperature setpoint and each channel's PID control coefficients. For example, possible Setpoint Temperature Module 923 outputs for a parting strip-type heating channel/section of an ice protection system associated with an aerodynamic structure (e.g. drone) with a cruise phase of flight state may be as shown in Table 2 below:

| | | | | Warm-up | | | Active | | | De-Icing | | |
|---|---|---|---|---|---|---|---|---|---|---|---|---|
| Pressure Altitude (ft.) | Angle of Attack (AoA) | Airspeed (KTAS) | Static Temp (° F.) | Set-Point Temp (° F.) | Power Density Limit | PID Values | Set-Point Temp (° F.) | Power Density Limit | PID Values | Set-Point Temp (° F.) | Power Density Limit | AD Values |
| TBD | TBD | TBD | 22 | 45 | 5 | K = 4<br>Ti = 0.025<br>Td = ∞ | 45 | 5 | K = 4<br>Ti = 0.025<br>Td = ∞ | 45 | 5 | K = 4<br>Ti = 0.025<br>Td = ∞ |
| | | | 9.5 | 60 | 10 | K = 4<br>Ti = 0.025<br>Td = ∞ | 60 | 10 | K = 4<br>Ti = 0.025<br>Td = ∞ | 60 | 10 | K = 4<br>Ti = 0.025<br>Td = ∞ |
| | | | −4 | 80 | 15 | K = 4<br>Ti = 0.025<br>Td = ∞ | 80 | 15 | K = 4<br>Ti = 0.025<br>Td = ∞ | 80 | 15 | K = 4<br>Ti = 0.025<br>Td = ∞ |
| | | | −22 | 105 | 15 | K = 4<br>Ti = 0.025<br>Td = ∞ | 105 | 15 | K = 4<br>Ti = 0.025<br>Td = ∞ | 105 | 15 | K = 4<br>Ti = 0.025<br>Td = ∞ | wherein "TBD" means "to be determined", and may, for example and without limitation, be determined during operation of the aerodynamic structure (i.e. measured by various types of sensors during flight).

Each temperature set-point can also be computed within the controller by empirical formula based on icing wind tunnel data. In other words, the controller can use a look-up table to select temperatures and drive parameters, or empirical formulas can be used to calculate them.

In particular embodiments, the update rate for the Setpoint Temperature Module 923 is once per second. Additionally, the controller can be operated in a Manual Mode, wherein the Setpoint Temperature Module 923 is bypassed, and a user-selected setpoint is provided to the Setpoint Throttle Module 924.

Setpoint Throttle (924)

As shown in FIG. 9 in the control loop 900, the controller may comprise a Setpoint Throttle Module 924. The Setpoint Throttle Module 924 may receive the following data items as inputs: each channel's budgeted status (from the Power Manager Module 926); each channel's conditioned thermocouple measurement (from the Thermocouple Channel Select 937); and each channel's ideal setpoint (from the Setpoint Temperature Module 923).

The Setpoint Throttle Module 924 calculates a setpoint based on a sinusoid that changes from the current observed temperature to the ideal setpoint gradually in a sinusoidal shape.

In particular embodiments, an alternative Setpoint Throttle Module 924 can determine an incremental heater temperature (i.e. delta-T setpoint) that the heater will be commanded to reach until the heater reaches an acceptable intermediate temperature or the ideal setpoint temperature. The Setpoint Throttle Module 924 may determine each channel's incremental delta-T setpoint based on an adaptive delta-T control (i.e. the Setpoint Throttle Module 924 calculates an incremental setpoint temperature based on the measured temperature and then slowly adjusts the incremental setpoint temperature to reach the ideal or manual setpoint temperature).

The adaptive delta-T calculation maintains the incremental heater setpoint at a calculated delta above the current measured temperature. This is accomplished by measuring the current temperature of the heater and adding the calculated delta value to provide a new heater set point. The delta value varies based on the temperature difference between the measured temperature and the ideal set point temperature. The rate of convergence as a set point increases can be set through a system configuration parameter called the Permitted Positive Percent Difference (PPPD).

PID Control Module (852/944)

As shown in FIG. 8 and in the control loop 900 illustrated in FIG. 9, the controller may comprise a PID Control Module 852/944. The PID Control Module 852/944 is used to control the operating temperature of the heating elements of the heating device (i.e. heaters 858/948).

The PID Control Module 852/944 may receive the following items as inputs: each channel's budgeted status per phase of flight, operating modes, and power management (from the Phase of Flight Module 920, Operating Mode Module 921, and Power Management Module 926); each channel's PID control parameters (from the Setpoint Temperature Module 923); each channel's adjusted setpoint (from the Setpoint Throttle Module 924); and each channel's conditioned thermocouple measurement (from the Thermocouple Channel Select 937). It will be appreciated that this PID Control Module 852/944 may receive other inputs as will be appreciated by one skilled in the art, and the preceding listing of inputs is intended solely as a non-exhaustive list of example inputs. The PID Control Module 852/944 may then output each heater channel/section's drive signal.

Figure 12:
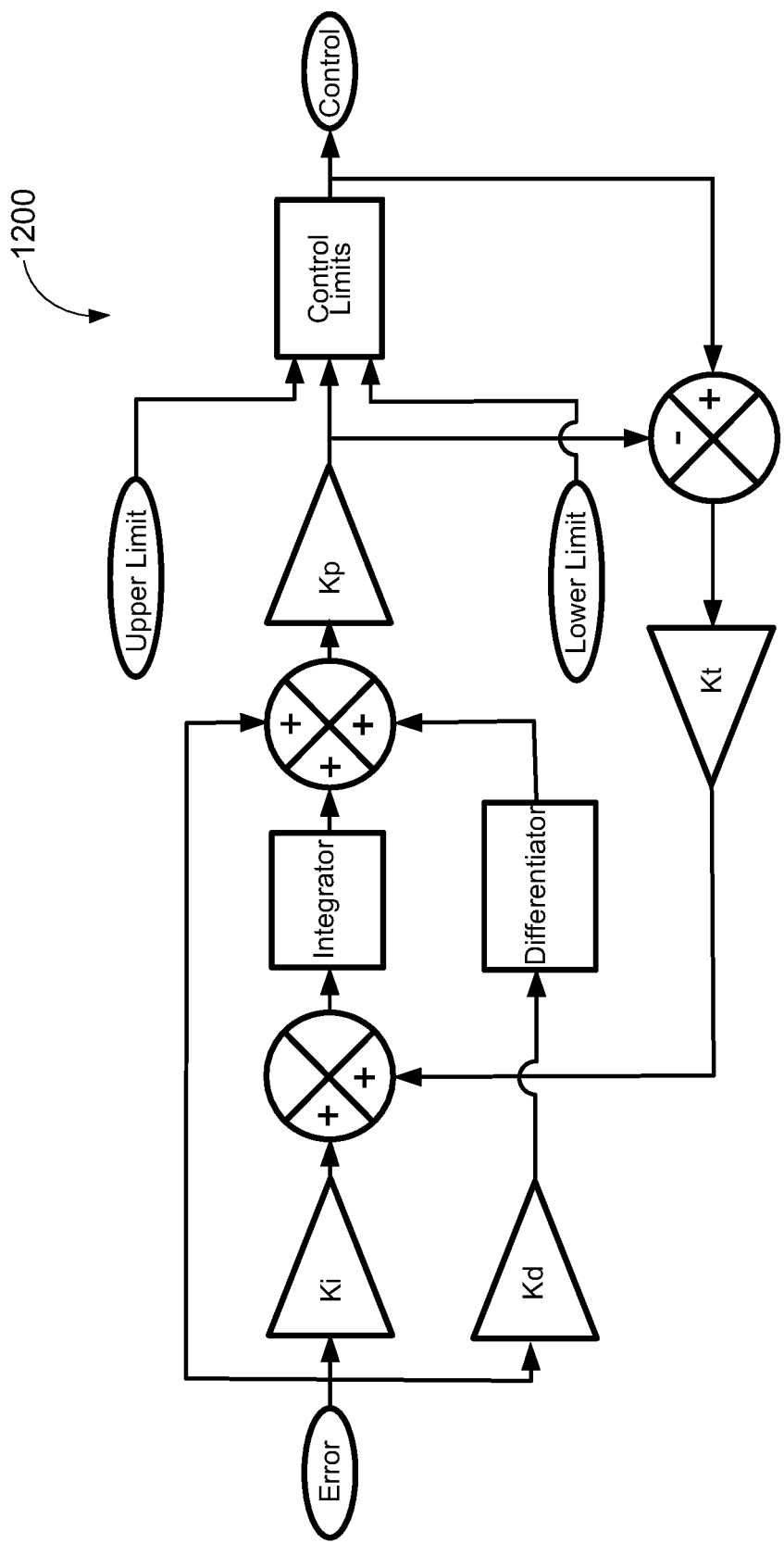
FIG. 12 illustrates a proportional-integral-derivative (PID) module control logic in accordance with one embodiment of the present disclosure.

In particular embodiments, the PID Control Module 852/944 output drive signal may be based on four coefficients (proportional, integral, derivative, and back calculation gain), as illustrated in FIG. 12. An error is the difference between the setpoint, which is provided by the Setpoint Throttle Module 924, and the process variable, which is the present temperature (provided by the Thermocouple Channel Select 937), and the PID gains are parameters supplied by the Setpoint Temperature Module 923 for each channel. The difference between the setpoint and the process variable $T_{set1} - T_{HC}$ is the Error term shown in FIG. 12.

The proportional gain ($K_p$) determines the ratio of output response to the error signal. The derivative component gain ($K_d$) parameter will cause the control system to react more strongly to changes in the error term. The integral term gain ($K_i$) determines the system responsiveness to long-term error. A phenomenon called integral windup results when integral action saturates a controller without the controller driving the error signal toward zero. Because the Power Management Module 926 will modify the output signal of the PID Control Module 852/944, the integral term will frequently be winding up against an invalid feedback path. Periodically resetting errors and the use of the throttled setpoint prevents such windup.

The Error term is:

$$\text{Error}(t=0) = T_{set1} - T_{HC}$$

In order to linearize the control loop and eliminate the need to predetermine what the integral limit should be, a back calculation value term is added to the integral term:

$$(1/T_i)[\text{Error}(t=0)] + (1/T_t)(\text{Drive \%}_{clamped} - \text{Drive \%})$$

The integral of the Error is the sum of all integral terms accumulated since the channel became budgeted using trapezoidal integration. The integral increment is multiplied by the calculation period (0.025 seconds).

$$\text{Error}_{integral}(t=0) = \\ ((integralTerm(t=0) + integralTerm(t=-1))/2] * t_{period}$$

$$\sum_{n=-\infty}^{0} \text{Error}_{integral}(t=n)$$

A maximum drive percent working in tandem with a saturation limit control affects the response of the PID by affecting the timing and rate at which the back calculation gain changes the integral term thereby affecting the output control. In addition, this maximum drive percent can be used to limit the controllable range of the channel to prevent accidental overheating. The maximum drive percent is calculated as follows:

$DRV_{\%max}$ = Percent Drive with a range of 0 to 100%

$V_{bus}$ = +270V_BUS_MON signal on HOSC $R_{htr}$ = Heater Resistance (calculated during BIT)

$P_{max\_htr}$ = Maximum Heater Power $R_1$ = 10 = Resistor Divider Resistor in k$\Omega$ $R_2$ = 44.2 = Resistor Divider Resistor in k$\Omega$ $$DRV_{\%max} = \left( \frac{\left(\frac{\sqrt{P_{max\_htr} * R_{htr}}}{V_{bus}} + 0.125\right) * \left(\frac{R_1 + R_2}{1.25 * R_1}\right) - 0.542}{0.434} \right)^2$$

This can be the maximum drive percent that may be applied to the saturation clamp in the PID algorithm. Due to errors in tolerance, offset and gain of various components over temperature it may be necessary to update the maximum drive percent periodically for a given setting. This equation does not account for any losses in the power electronics, and as a result the initial commanded maximum power will likely result in a maximum drive percent that is less than what is desired.

The PID output is a clamped drive percent, Drive $\%_{clamped}$, which is the lesser of DRV $\%_{max}$ and Drive %.

The derivative of the Error is

Error($t$=0)−Error($t$=−1)

Thus, in particular embodiments, the PID Control Module 852/944 output drive signal may be determined according to FIG. 12.

Drive and Sense Module (855/946)

As shown in the control loop 900 illustrated in FIG. 9, the controller may comprise a Drive and Sense Module 855/946. The Drive and Sense Module 855/946 may convert the drive signal (from the PID Control Module 852/944) into current through the heater 858/948 (i.e. one or more of the heating elements or heating sections of the heating device). The Drive and Sense Module 855/946 may also limit the maximum power delivered to the heater 858/948 (i.e. heating device) at any one time.

In particular embodiments, the Drive and Sense Module 855/946 can receive the following values as inputs: global enabled/disabled status (from configuration settings 822); channels budgeted (from the Power Management Module 926); each channel's proportional drive signal (from the PID Control Module 852/944); each channel's maximum operational power limit, $P_L$ (from the Power Management Module 926); and each channel's drive limit (from pre-determined system configuration settings 822). In further embodiments, the Drive and Sense Module 855/946 can output: each heater channel's voltage; each channel's current; and each channel's present calculated power draw.

In preferred embodiments, the Drive and Sense Module 855/946 uses a buck converter topology as discussed above and a pulse-width modulation (PWM) duty cycle to modulate the output to the heaters. The duty cycle, d, of a buck converter in (continuous mode) typically reduces the voltage proportional to the reduction in duty cycle from 100% (e.g. $V_{out}=d \times V_{in}$). Since the final load (the heater) is mostly resistive, it is assumed that current will tend towards a proportional response as well. The heater power, then, will settle to:

$$P = V_{out}^2 \div R_{heater}$$

$$\frac{(dV_{in})^2}{R_{heater}}$$

$$\frac{d^2 V_{in}^2}{R_{heater}}$$

Thus, the power (P) is therefore proportional to the square of the duty cycle, and in accordance with one embodiment of the present disclosure, the Drive and Sense Module 855/946 converts the drive signal ($D_0$) into a duty cycle (0≤d≤1.0) used by the power circuit to control the output voltage to the heater. If the drive signal, $D_0$, is to be proportional to the power output of the drive circuit, then the conversion from drive signal to duty cycle must include a square root: $d=\sqrt{d_0}$.

In accordance with a further embodiment, the Drive and Sense Module 855/946 limits the duty cycle of the heater to the channel drive limit.

In accordance with still another embodiment, the Drive and Sense Module 855/946 limits the output power to the heater to the maximum power limit, $P_L$. Each channel is also protected against overload by comparing the product of voltage (V) and current (I) (i.e., power) to the power limit (in Watts) provided to the Drive and Sense Module 855/946 for each channel. The V×I product may be smoothed (e.g. averaged over three points) to reduce false tripping. The power to a channel that is exceeding the power limit may be reduced by reducing the received drive signal in response to the overload as long as the received drive signal is above the limited drive signal.

Power Management Module (926)

As shown in the control loop 900 illustrated in FIG. 9, the controller may comprise a Power Management Module 926. The Power Management Module 926 can determine the maximum output power allowed to each channel to ensure that the ice protection system consumes less than the maximum allowed system power. The Power Management Module 926 may also sequence or cycle power to groups of channels/sections of heaters.

In particular embodiments, the Power Management Module 926 may receive, for example and without limitation, as inputs: each channel's enabled/disabled status (from configuration settings 822); pre-determined configuration settings; maximum system power limit for all channels, a system power margin; channel groupings (per phase of flight and operating mode states); channel power priority; group sequence on time; and each channel's current power reading (from the Drive and Sense Module 855/946). The Power Management Module 926 may then arrive at a list of budgeted channels by removing one or more scheduled channels/heating elements 858/948.

In some embodiments, the Power Management Module 926 is responsible for cycling through power groups as specified by the pre-determined configuration settings 822, for example, based on select groups associated with the phase of flight and operating mode, and/or changing groups based on elapsed sequence time.

Figure 13:
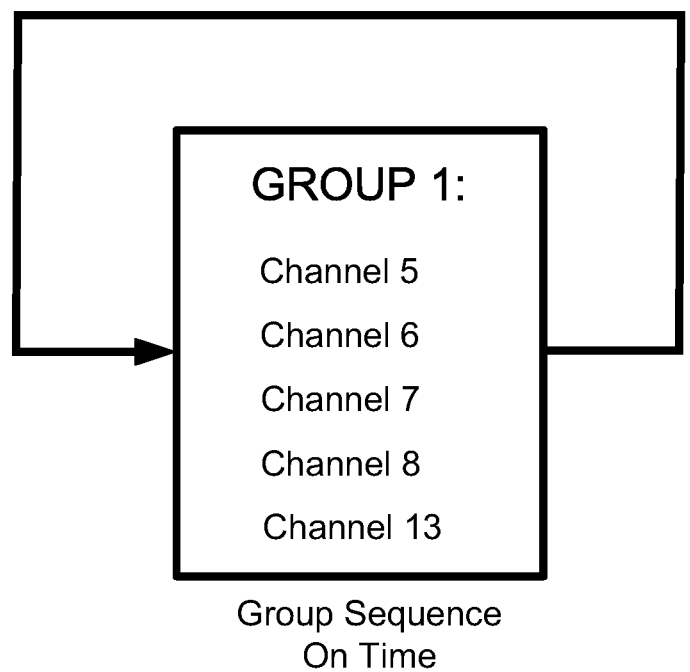
FIG. 13 illustrates one sequence of powering the heater sections shown in FIG. 4 in accordance with one embodiment of the ice protection system.

With reference to FIG. 13, where plenty of power is available, then the typical anti-ice procedure would be to heat the parting strips continuously, and during the Active mode, there might be one group that contains all of the parting strips and the inlet (channels 5, 6, 7, 8, and 13 as illustrated in FIG. 4), which is cycled through as long as the mode and phase of flight is constant as illustrated.

Figure 14:
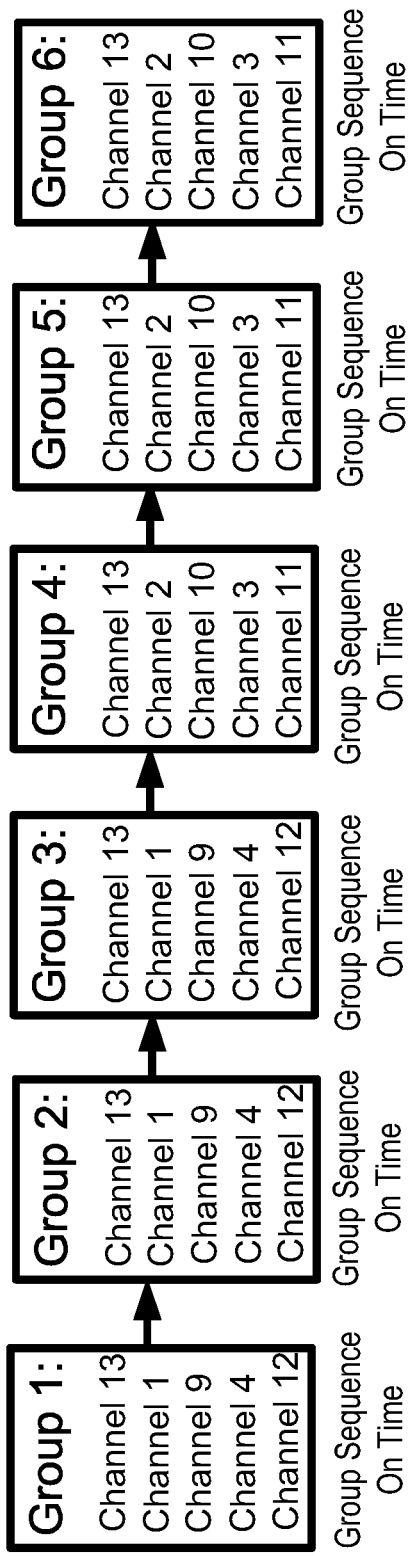
FIG. 14 illustrates a second sequence of powering the heater sections shown in FIG. 4 in accordance with another embodiment of the ice protection system.

If, as an example, a portion of the channels as illustrated in FIG. 4 were desired to run longer than one cycle, they may be included in multiple groups in a series as shown in FIG. 14.

Figure 15:
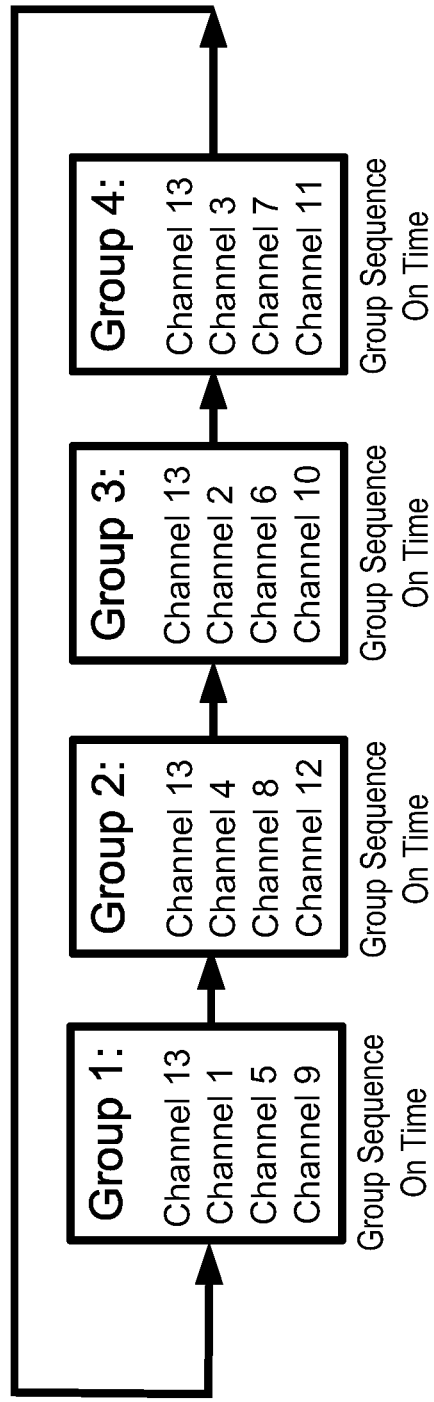
FIG. 15 illustrates a third sequence of powering the heater sections shown in FIG. 4 in accordance with still another embodiment of the ice protection system.

Additionally, with reference to FIG. 15, when de-icing is called for and there is not enough power for all run-back channels to run at once, then they may be cycled as illustrated.

In particular embodiments, the placement of channels, groupings of channels/sections, cycling, and sequence on time may vary based on pre-determined system configuration settings 822. In some embodiments, the system power is calculated by summing all individual active channel power values, and the Power Management Module 926 reduces the system power limit by the system power margin to account for inefficiencies in power conversions, system losses, and internal power consumption. If the maximum power limit is exceeded, then the Power Management Module 926 may de-schedule the lowest priority channels until the total power draw is below the maximum system power limit. Then, when the channel input signals change, the scheduled/unscheduled statuses of the channels are reset, allowing for other channels to be budgeted as needed.

Demultiplexer (856/947)

The Demultiplexer 856/947 ("MUX") is an optional component that may be utilized to increase the number of output channels of the controller. The Demultiplexer 856/947 may receive power (voltage and current) from the Drive and Sense Module 855/946 and supply that power to a selection of individual heaters or simultaneously to a plurality of heaters as selected by the configuration settings 822.

Methods

Figure 16:
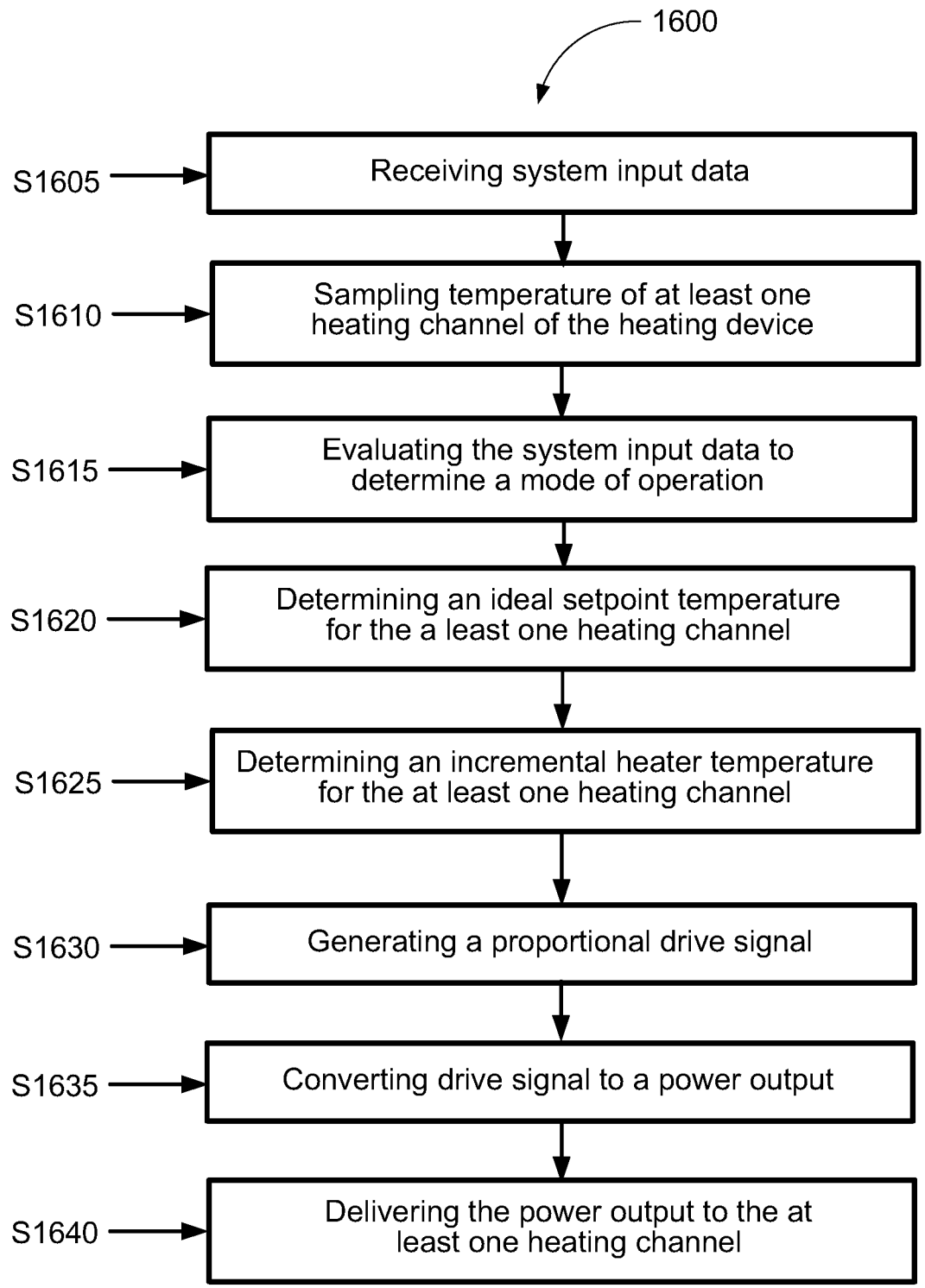
FIG. 16 is a flowchart illustrating an exemplary method of powering an ice-protection system in accordance with one embodiment of the present disclosure.

Also disclosed herein are methods of powering an ice-protection system having a controller and a heating device. With reference to FIG. 16, a method 1600 of powering an ice-protection system in accordance with an exemplary embodiment of the present disclosure is shown. The method includes: receiving system input data (S1605); sampling the temperature at least one heating channel of the heating device (S1610); evaluating the system input data to determine a mode of operation (S1615); determining an ideal setpoint temperature for the at least one heating device (S1620); determining an incremental heater temperature or progressive adjustment temperature (e.g. half wave of a sinusoid) for the at least one heating channel (S1625); generating a proportional drive signal (S1630); converting the proportional drive signal to a power output (S1635); and delivering the power output to the at least one heating channel (S1640). In particular embodiments, one or more of the receiving system input data, sampling the temperature, evaluating the system input data, determining an ideal setpoint temperature, determining an incremental or progressive adjustment heater temperature, generating a proportional drive signal, converting the proportional drive signal, and delivering the power output are performed by the controller of the ice-protection system.

In a step S1605, a controller of the ice-protection system may receive system input data for the associated aerodynamic structure. The system input data may be received from one or more sensors of the associated aerodynamic structure, and can be stored in an electronically-readable memory. The system input data can include at least one of: an angle of attack (AoA) of the associated aerodynamic structure; a true airspeed of the associated aerodynamic structure; a pressure altitude; an outside air temperature (OAT); a weight on wheels of the associated aerodynamic structure; an aircraft ice sensor data; a payload in use data; and the temperature of the at least one heating channel.

In a step S1610, the temperature for each of the at least one heating channels of the heating device is sampled. The temperature of the at least one heating channel may be sampled using one or more thermocouples connected to or in proximity to each of the at least one heating channels. The temperature of the at least one heating channel may be sampled at least 125 samples per second (every 8 milliseconds). In further embodiments, the method also includes: determining a conditioned temperature for the at least one heating channel based on the sampled temperatures of the at least one heating channel. In some embodiments, the conditioned temperature is determined by averaging one or more sampled temperatures. In particular, the conditioned temperature for the at least one heating channel may be determined (i.e. updated) every 25 milliseconds. In other words, the conditioned temperature is determined every 25 milliseconds for example by averaging at least three of the temperatures sampled over the previous 25 milliseconds. The individual temperature samples and the conditioned temperatures can be stored in an electronically-readable memory of the controller and processed by a processor of the controller.

In a step S1615, the system input data is evaluated to determine a mode of operation for the ice-protection system. The mode of operation can be a standby mode, a warm-up mode, an active mode, or a de-icing mode, for example. The mode of operation determines how the heating elements of the heating device are operated. When the ice-protection system is enabled, the operating mode may shift between different modes of operation. In particular embodiments, the mode of operation is determined based on the system input data, and the sampled heating channel temperature measurements.

In some embodiments, the method further includes determining a phase of flight state is determined for the associated aerodynamic structure based on the system input data received. In particular, the mode of operation may also be determined based on the phase of flight state.

In a step S1620, an ideal setpoint temperature for the at least one heating channel of the heating device is determined. The ideal setpoint temperature is the temperature setting determined for each particular heating channel of the heating device, and may be based on at least one of the following: the mode of operation for the ice-protection system; the system input data for the associated aerodynamic structure; and the temperature of the at least one heating channel. In particular embodiments, the ideal setpoint temperature may also be based on the conditioned temperature for the at least one heating channel, as well as the phase of flight state. In some embodiments, the ideal setpoint temperature for one or more of the at least one heating channels is determined about once per second.

In a step S1625, a progressively adjusted setpoint temperature for at least one heating channel is determined. The progressively adjusted setpoint temperature may use a sinusoidal function that matches the sinusoidal minimum to the current (e.g. conditioned) temperature of the at least one heating channel and the ideal setpoint temperature to a sinusoidal maximum such that the setpoint temperature progressively increases from the current temperature to the ideal setpoint temperature with a tangential approach (zero slope) at the sinusoidal maximum (ideal setpoint temperature). For ideal setpoint temperatures equal to or colder than the current (e.g. conditioned) temperature of any at least one heating channel, a progressively adjusted setpoint temperature may not be utilized, in which case the ideal setpoint temperature is conveyed to the PID control module unmodified.

In a step S1630, a proportional drive signal is generated for the at least one heating channel of the heating device. Each channel of the at least one heating channel may have a proportional drive signal generated. The proportional drive signal may be generated using a proportional-integral-derivative control loop based on the temperature of the at least one heating channel, the system input data for the associated aerodynamic structure, and the progressively adjusted setpoint temperature for the at least one heating channel. In particular embodiments, the drive signal is based on the conditioned temperature determined for the at least one heating channel. The proportional drive signals may be generated by the processor of the controller and stored in an electronically-readable memory.

In a step S1635, the proportional drive signal for the at least one heating channel is converted to a power output to be delivered to the at least one heating channel. In particular embodiments, converting the proportional drive signal to a power output is determined by: calculating a duty cycle for a buck converter of the controller associated with the at least one heating channel based on the proportional drive signal; and determining a power output delivered to the at least one heating channel based on the duty cycle. In particular embodiments, the duty cycle may be limited to a channel drive limit. In further embodiments, the power output may be limited to a maximum power limit ($P_L$). The proportional drive signals may be converted to a power output to be delivered to the heating device by the processor of the controller.

In a step S1640, the power output is delivered to the at least one heating channel of the heating device. The power output may be delivered to at least one heating channel by the controller from a direct current (DC) power supply of the associated aerodynamic structure. In particular embodiments, an output power maximum is calculated based on each heating channel's budgeted status; each channel's power density limit; the configuration settings; the maximum system power limit, the system power margin; and each channel's physical area. In some embodiments, one or more of the at least one heating channels are grouped together and delivered power in an ordered sequence (i.e. consecutively) in order to reduce the total power output required to be delivered from the controller. In some embodiments, this may occur through an optional demultiplexer module. Additionally, one or more of the at least one heating channels may be disabled (i.e. turned off) if the maximum system power limit is exceeded. The power output may be determined repetitively, as system conditions change, such as the phase of flight and operating mode state, for example.

One or more of the receiving system input data, sampling the temperature, evaluating the system input data, determining an ideal setpoint temperature, determining an incremental heater temperature, generating a proportional drive signal, converting the proportional drive signal, and delivering the power output may be performed by the controller of the ice-protection system.

In further embodiments, the method 1600 can be repetitively performed for one or more of the heater channels of the heating device.

In particular embodiments, the ice-protection system of method 1600 includes a controller and a heating device. The controller can include a power circuit topology and at least one processor. The controller may also include an electronically-readable memory. The power circuit topology may have a protect circuit and one or more buck converter circuits connected to the heating device. The heating device can be an array of resistive heating elements, such as CNT-based resistive heaters. In some embodiments, the array of heating elements may be divided into one or more heater sections or heater channels. The controller may comprise a buck converter circuit for each heater channel of the heating device. The associated aerodynamic structure may be a direct current (DC) power supply that delivers power to the heating device of the ice-protection system disclosed herein, via the power circuit topology of the controller based on the inputs received and instructions executed by the at least one processor of the controller. In some embodiments, the buck converter circuits employ hard-switching with a switching frequency of at least 500 kHz. In some embodiments, an optional demultiplexer (MUX) may be utilized to increase available channels.

The RHC controller can be a microcontroller. The controller may include an electronically-readable memory configured to storage instructions that can be executed by the processor. In particular embodiments, the memory may include: a phase of flight module; an operating mode module; a setpoint temperature module; a setpoint throttle module; a PID control module; a drive and sense module; a power management module; and a thermocouple channel select. In further embodiments, the processor is configured to execute the instructions provided by these modules as discussed above.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and components presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The exemplary method(s) may be implemented on one or more general purpose computers, special purpose computer(s), a programmed microprocessor or microcontroller and peripheral integrated circuit elements, an ASIC or other integrated circuit, a digital signal processor, a hard-wired electronic or logic circuit such as a discrete element circuit, a programmable logic device such as a PLD, PLA, FPGA, Graphical card CPU (GPU), or PAL, or the like. As will be appreciated, while the steps of the method may all be computer implemented, in some embodiments one or more of the steps may be at least partially performed manually.

Alternatively, the method may be implemented in transitory media, such as a transmittable carrier wave in which the control program is embodied as a data signal using transmission media, such as acoustic or light waves, such as those generated during radio wave and infrared data communications, and the like.

Aspects of the exemplary embodiments related to ice protection systems and methods are described herein. However, application of the systems and methods set forth can be made to other areas utilizing an anti-icing or de-icing protection, or to heating of existing structures or materials.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof. That is to say, it will be appreciated that various of the above-disclosed and other features and functions, or alternatives thereof, may be desirably combined into many other different systems or applications, and also that various presently unforeseen or unanticipated alternatives, modifications, variations or improvements therein may be subsequently made by those skilled in the art which are similarly intended to be encompassed by the following claims.

What is claimed is:

1. An ice protection system connected to an associated aerodynamic structure, the system comprising:
   a heating device having a plurality of carbon nanotube (CNT) resistive heating elements; and
   a controller comprising:
      a power circuit topology having at least one buck converter; and
      a processor in communication with memory, the memory storing instructions which are executed by the processor causing the processor to:
         determine an ideal setpoint temperature for one or more of the plurality of CNT resistive heating elements;
         determine a progressively adjusted setpoint temperature by comparing the ideal setpoint temperature to a current measured temperature for one or more of the plurality of CNT resistive heating elements; and
         produce a proportional drive signal output based on at least the measured current temperature and the instantaneous progressively adjusted setpoint temperature.

2. The system of claim 1, wherein a heater drive power comprises a direct current (DC) power supply connected to the heating device.

3. The system of claim 1, wherein the buck converter comprises one or more switching field-effect transistors (FETs) formed from silicon carbide (SiC).

4. The system of claim 1, wherein the power circuit topology has a switching frequency of 500 kHz or greater.

5. The system of claim 1, wherein the power circuit topology has a transition time between on and off states of less than 10 nanoseconds.

6. The system of claim 1, wherein the power circuit topology has an efficiency rating of greater than 98% at rated output.

7. A method of powering an ice-protection system of an associated aerodynamic structure wherein the ice-protection system has a controller and a heating device, the method comprising:
   sampling the temperature of at least one heating channel of the heating device;
   determining an ideal setpoint temperature for the at least one heating channel of the heating device;
   determining a progressively adjusted setpoint temperature for the at least one heating channel;
   generating a proportional drive signal for the at least one heating channel of the heating device;
   converting the proportional drive signal for the at least one heating channel of the heating device into a power output to be delivered to at least one heating channel; and
   delivering the power output to the at least one heating channel;
   wherein one or more of sampling the temperature, determining an ideal setpoint temperature, determining a progressively adjusted setpoint temperature, generating a proportional drive signal, converting the proportional drive signal, and delivering the power output is performed by the controller of the ice-protection system.

8. The method of claim 7, wherein the ideal setpoint temperature for the at least one heating channel is determined about once per second.

9. The method of claim 7, wherein the sampling of the temperature of at least one heating channel is performed using two channel thermocouples per heating channel.

10. The method of claim 9, wherein the temperature of at least one heating channel is sampled at least 125 times per second.

11. The method of claim 9, wherein the method further comprises determining a conditioned temperature for at least one heating channel based on more than one sampled temperature of the at least one heating channel, and at least one of the determining the ideal setpoint temperature, the determining an progressively adjusted setpoint temperature, and the generating the proportional drive signal is further based on the conditioned temperature for the at least one heating channel.

12. The method of claim 11, wherein the conditioned temperature for at least one heating channel is updated at least every 25 milliseconds.

13. The method of claim 7, wherein the converting the proportional drive signal includes:
   calculating a duty cycle for a buck converter of the controller associated with at least one heating channel based on the proportional drive signal; and
   determining the power output to be delivered to the at least one heating channel based on the duty cycle.

14. The method of claim 7, wherein the power output is delivered to at least one heating channel from a direct current (DC) power supply of the controller.

15. The method of claim 7, wherein the power from the controller is routed to at least one heating channel through a demultiplexer module.

16. The method of claim 7, wherein the heating device is an array of CNT resistive heating elements and at least one heating channel is a group of one or more CNT resistive heating elements of the array of CNT resistive heating elements.

17. A method of powering an ice-protection system of an associated aerodynamic structure wherein the ice-protection system has a controller and a heating device, the method comprising:
  receiving system input data for the associated aerodynamic structure;
  evaluating the system input data for the associated aerodynamic structure to determine a mode of operation for the ice-protection system;
  sampling the temperature of at least one heating channel of the heating device;
  determining an ideal setpoint temperature for the at least one heating channel of the heating device based on the mode of operation for the ice-protection system, the system input data for the associated aerodynamic structure, and the temperature of the at least one heating channel;
  determining a progressively adjusted setpoint temperature for the at least one heating channel based on the mode of operation for the ice-protection system, the system input data for the associated aerodynamic structure, the temperature of the at least one heating channel, the ideal setpoint temperature for the at least one heating channel, and a configuration setting data for the heating device;
  generating a proportional drive signal for the at least one heating channel of the heating device using a proportional-integral-derivative control loop based on the temperature of the at least one heating channel, the system input data for the associated aerodynamic structure, and the instantaneous progressively adjusted setpoint temperature for the at least one heating channel;
  converting the proportional drive signal for the at least one heating channel of the heating device into a power output to be delivered to at least one heating channel; and
  delivering the power output to the at least one heating channel;
  wherein one or more of the receiving system input data, sampling the temperature, evaluating the system input data, determining an ideal setpoint temperature, determining a progressively adjusted setpoint temperature, generating a proportional drive signal, converting the proportional drive signal, and delivering the power output is performed by the controller of the ice-protection system.

18. The method of claim 17, wherein the progressively adjusted setpoint temperature for the at least one heating channel is determined by adjusting the temperature of the at least one heating channel by matching to a halfwave of a sinusoid, and wherein the amplitude and period of the sinusoid is based on the mode of operation for the ice-protection system, the system input data for the associated aerodynamic structure, the temperature of the at least one heating channel, the ideal setpoint temperature for the at least one heating channel, and a configuration setting data for the heating device.

19. The method of claim 17, wherein a phase of flight state is determined for the associated aerodynamic structure based on the system input data received.

20. The method of claim 19, wherein the ideal setpoint temperature for the at least one heating channel is further based on the phase of flight state.

* * * * *